US012545031B2

(12) United States Patent
Murase et al.

(10) Patent No.: US 12,545,031 B2
(45) Date of Patent: Feb. 10, 2026

(54) LIQUID EJECTING APPARATUS, CONTROL METHOD, AND STORAGE MEDIUM

(71) Applicant: CANON KABUSHIKI KAISHA, Tokyo (JP)

(72) Inventors: Takeshi Murase, Kanagawa (JP); Soji Kondo, Kanagawa (JP); Koichi Kubo, Kanagawa (JP); Masaki Nitta, Kanagawa (JP); Hiroshi Taira, Tokyo (JP); Hiroshi Kawafuji, Tokyo (JP); Sae Mogi, Kanagawa (JP); Shunnosuke Koseki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 18/524,987

(22) Filed: Nov. 30, 2023

(65) Prior Publication Data

US 2024/0198689 A1 Jun. 20, 2024

(30) Foreign Application Priority Data

Dec. 16, 2022 (JP) ................................ 2022-201568

(51) Int. Cl.
*B41J 2/175* (2006.01)
*B41J 2/165* (2006.01)
(Continued)

(52) U.S. Cl.
CPC ....... *B41J 2/17596* (2013.01); *B41J 2/16532* (2013.01); *B41J 2/17523* (2013.01);
(Continued)

(58) Field of Classification Search
CPC ................ B41J 2/17596; B41J 2/16532; B41J 2/17523; B41J 2/18; B41J 2/19; B41J 2202/07; B41J 2202/12; B41J 2202/20; B41J 2/14024; B41J 2/185; B41J 2/175; B41J 2/165
See application file for complete search history.

(56) References Cited

U.S. PATENT DOCUMENTS 7,950,790 B2 5/2011 Kubo et al. .............. B41J 2/175
8,002,397 B2 8/2011 Udagawa et al. ......... B41J 2/21
(Continued)

FOREIGN PATENT DOCUMENTS

CN 102001226 A * 4/2011 .............. B41J 2/125
CN 101746126 B * 7/2012 .......... B41J 2/17596
JP 2012-148471 8/2012

OTHER PUBLICATIONS

U.S. Appl. No. 18/399,551, filed Dec. 28, 2023.
Extended European Search Report dated Jun. 6, 2024 in counterpart EP Application No. 23214652.2.

*Primary Examiner* — Justin Seo
(74) *Attorney, Agent, or Firm* — Venable LLP

(57) ABSTRACT

A liquid ejecting apparatus includes: a circulation channel; a circulating pump configured to circulate a liquid in the circulation channel; and a control unit configured to perform control that drives the circulating pump at a first number of times of driving in a case of performing a printing operation in which the liquid is ejected onto a printing medium, and drives the circulating pump at a second number of times of driving smaller than the first number of times of driving in a predetermined case which is before performing the printing operation.

19 Claims, 20 Drawing Sheets

| MODE | NUMBER OF TIMES OF DRIVING OF CIRCULATING PUMP |
|---|---|
| BUBBLE DISCHARGE MODE (fr1) | 15 Hz |
| NORMALMODE (fr2) | 60 Hz |

(51) Int. Cl.
*B41J 2/18* (2006.01)
*B41J 2/19* (2006.01)

(52) U.S. Cl.
CPC .. *B41J 2/18* (2013.01); *B41J 2/19* (2013.01); *B41J 2202/07* (2013.01); *B41J 2202/12* (2013.01)

(56) References Cited

U.S. PATENT DOCUMENTS

| | | | | |
|---|---|---|---|---|
| 8,047,641 | B2 | 11/2011 | Nanjo et al. | B41J 2/175 |
| 8,205,974 | B2 | 6/2012 | Ogura et al. | B41J 2/175 |
| 8,469,498 | B2 | 6/2013 | Ohashi et al. | B41J 2/175 |
| 8,529,037 | B2 | 9/2013 | Miyashita et al. | B41J 2/175 |
| 8,770,730 | B2 | 7/2014 | Nanjo et al. | B41J 2/175 |
| 8,770,731 | B2 | 7/2014 | Miyashita et al. | B41J 2/175 |
| 8,960,869 | B2 | 2/2015 | Takada et al. | B41J 2/175 |
| 9,016,842 | B2 | 4/2015 | Miyashita et al. | B41J 2/175 |
| 9,278,540 | B2 | 3/2016 | Seki et al. | B41J 2/175 |
| 9,333,758 | B2 | 5/2016 | Koshikawa et al. | B41J 2/175 |
| 9,375,938 | B2 | 6/2016 | Kondo et al. | B41J 2/015 |
| 9,597,884 | B2 | 3/2017 | Nanjo et al. | B41J 15/04 |
| 9,694,585 | B2 | 7/2017 | Shiba et al. | B41J 2/175 |
| 9,821,562 | B2 | 11/2017 | Nanjo et al. | B41J 2/175 |
| 9,840,082 | B2 | 12/2017 | Nanjo et al. | B41J 2/175 |
| 9,908,338 | B2 | 3/2018 | Koshikawa et al. | B41J 2/175 |
| 10,207,511 | B2 | 2/2019 | Nanjo et al. | B41J 2/175 |
| 10,618,284 | B2 | 4/2020 | Kondo | B41J 2/14 |
| 11,077,670 | B2 | 8/2021 | Danzuka et al. | B41J 2/175 |
| 11,298,953 | B2 | 4/2022 | Mogi et al. | B41J 2/045 |
| 11,565,530 | B2 | 1/2023 | Fukushima et al. | B41J 2/175 |
| 2019/0299592 | A1 | 10/2019 | Iwasaki et al. | B41J 2/045 |
| 2020/0108626 | A1 | 4/2020 | Fukasawa et al. | B41J 2/18 |

* cited by examiner

| MODE | NUMBER OF TIMES OF DRIVING OF CIRCULATING PUMP |
|---|---|
| BUBBLE DISCHARGE MODE (fr1) | 15 Hz |
| NORMALMODE (fr2) | 60 Hz |

FIG.16

| | ELAPSED TIME THRESHOLD VALUE | CIRCULATION TIME |
|---|---|---|
| CONDITION 1 | 1 WEEK | 60 SECONDS |
| CONDITION 2 | 1 MONTH | 180 SECONDS |

FIG.18

| | | ENVIRONMETAL TEMPERATURE | | |
|---|---|---|---|---|
| | | LESS THAN 20°C | 20°C OR MORE AND LESS THAN 30°C | 30°C OR MORE |
| ELAPSED TIME | 1 WEEK OR LESS | FEW | FEW | FEW |
| | 1 MONTH OR LESS | FEW | FEW | MANY |
| | MORE THAN 1 MONTH | FEW | MANY | MANY |

FIG.20

LIQUID EJECTING APPARATUS, CONTROL METHOD, AND STORAGE MEDIUM

BACKGROUND

Field

The present disclosure relates to a liquid ejecting apparatus, a control method, and a storage medium.

Description of the Related Art

Inkjet printing heads which perform printing on a printing medium by ejecting liquids such as inks have been known as printing heads to be used in printing apparatuses. Printing apparatuses equipped with an inkjet printing head are configured to be supplied with liquids from ink tanks into the printing head through supply channels and print an image based on image data designated by a user. Also, there are printing apparatuses that have circulation channels through which to circulate liquids for purposes such as preventing precipitation of color materials and thickening of the liquids. In addition, the growing demand for smaller apparatus sizes has made printing heads smaller and smaller in size. As a result, the circulation channels have become so fine that their flow resistance is high. This makes the channels prone to clogging.

Japanese Patent Laid-Open No. 2012-148471 proposes a method to prevent clogging of a circulation channel by controlling the output of a pump such that the flow velocity of a liquid inside the circulation channel will be more than or equal to a predetermined value.

To increase the flow velocity in order to prevent channel clogging as in Japanese Patent Laid-Open No. 2012-148471, it is necessary to increase the number of times the pump is driven per unit time. However, increasing the number of times the pump is driven per unit time decreases the negative pressure to be generated by driving the pump once. Increasing the number of times the pump is driven per unit time in a state where many bubbles have been generated may result in a failure to obtain a negative pressure necessary for pushing out the bubbles inside the pump and impair the performance of liquid circulation using the pump. This may lead to a condition where the liquid inside the circulation channel does not properly circulate.

SUMMARY

A liquid ejecting apparatus of the present disclosure includes: a circulation channel through which a liquid circulates, the circulation channel including a pressure chamber having an ejection orifice configured to discharge the liquid onto a printing medium, a supply channel configured to supply the liquid to the pressure chamber, and a collection channel configured to collect the liquid from the pressure chamber; a circulating pump configured to circulate the liquid in the circulation channel; and a control unit configured to perform control that drives the circulating pump at a first number of times of driving per unit time in a case of performing a printing operation in which the liquid is ejected onto a printing medium, and drives the circulating pump at a second number of times of driving per unit time smaller than the first number of times of driving per unit time in a predetermined case which is before performing the printing operation.

Further features of the present disclosure will become apparent from the following description of exemplary embodiments with reference to the attached drawings.

BRIEF DESCRIPTION OF THE DRAWINGS

FIG. 16 is a table illustrating the numbers of times the circulating pump is driven in a bubble discharge mode and a normal mode;

FIG. 18 is a table illustrating an example of unused times and ink circulation times corresponding to the respective unused times;

FIG. 20 is a table to be used to analogize the amount of bubbles generated.

DESCRIPTION OF THE EMBODIMENTS

Embodiments of the technique of the present disclosure will be described below using the drawings. The following embodiments are not intended to limit the scope of the technique of the present disclosure. In the following embodiments, a thermal method in which a liquid is ejected by generating a bubble with a heating element is described as an example liquid ejection method. However, the liquid ejection method is not limited to the thermal method. The technique of the present disclosure is also applicable to liquid ejecting apparatuses employing a piezoelectric method and various other liquid ejection methods. Moreover, pumps, pressure adjusting units, and so on are not limited to those described in the following embodiments as long as they have functions equivalent to those of the described components.

First Embodiment

First, an apparatus configuration and a printing head configuration that are common to each embodiment will be described. Then, a process flow in a first embodiment will be described.

[Description of Liquid Ejecting Apparatus]

Figure 1:
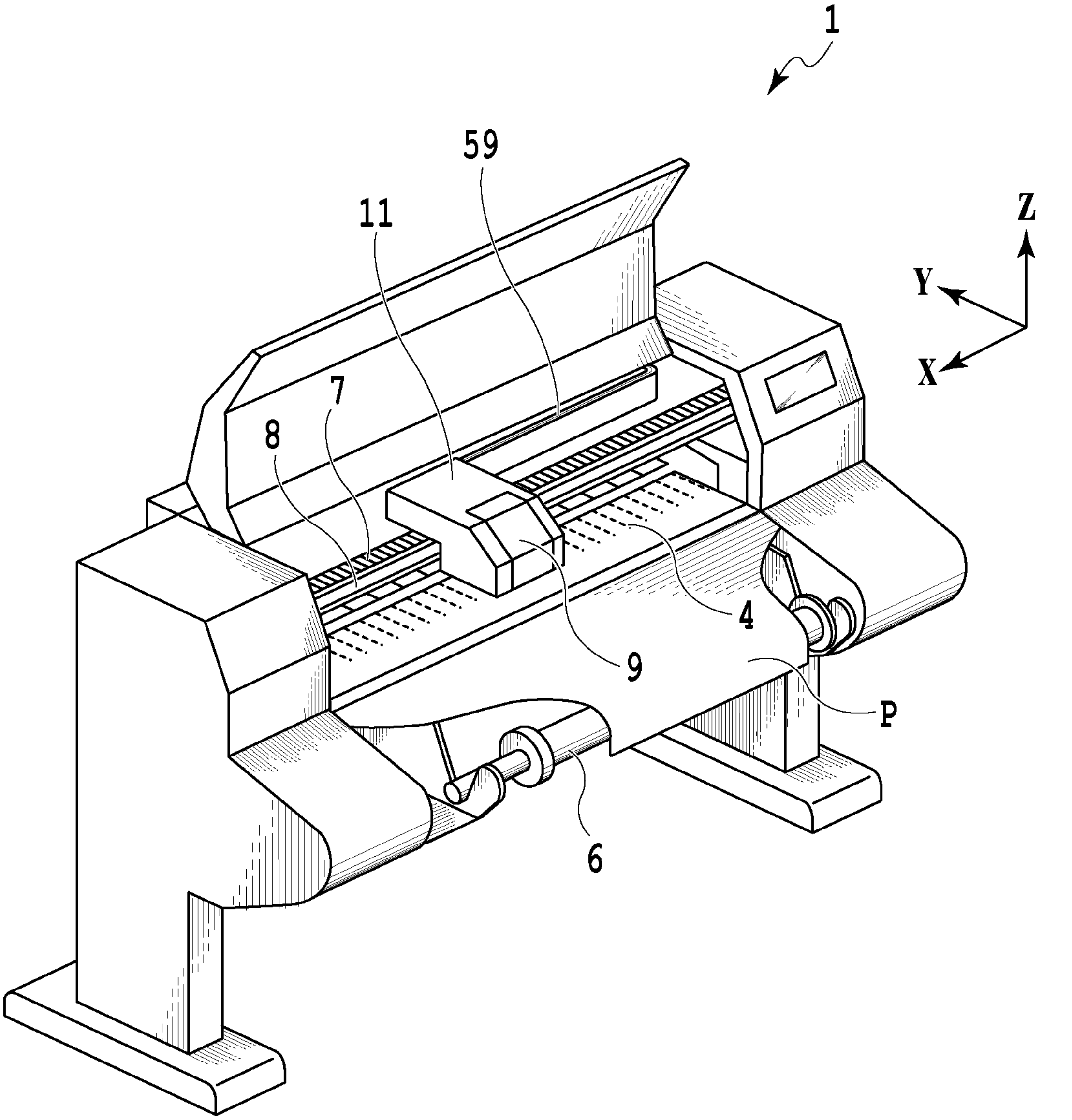
FIG. 1 is a view illustrating an outer appearance of a printing apparatus.

FIG. 1 is a view illustrating an outer appearance of an inkjet printing apparatus (hereinafter referred to as "printing apparatus") 1 being a liquid ejecting apparatus according to the present embodiment. The printing apparatus 1 in FIG. 1 is a so-called serial scan-type printing apparatus, and its printing head 9 (also referred to as "liquid ejecting head") forms (prints) an image on a printing medium P while being scanned in a main scanning direction which is a direction orthogonal to the conveyance direction of the printing medium P (main scan). The X and Y directions in FIG. 1 are the main scanning direction and the conveyance direction of the printing medium, respectively. The Z direction is the vertical direction.

A configuration of the printing apparatus 1 and its operation during printing will be generally described using FIG. 1. First, the printing medium P is conveyed in the conveyance direction by a sheet feeding roller driven by a sheet feeding motor 5 (see FIG. 3) via gears and a spool 6 holding the printing medium P. The printing head 9, which is detachably attachable, is mounted on a carriage unit 11. A carriage motor 119 (see FIG. 3) scans the carriage unit 11 along a guide shaft 8 extending in the main scanning direction at a predetermined conveyance position. In this scanning, liquids, such as inks, for example, are ejected from ejection orifices (nozzles) in the printing head 9 mounted on the carriage unit 11 with timing based on position signals obtained by an encoder 7. As a result, an image with a certain band width corresponding to the nozzle array range is printed on the printing medium P.

The printing head 9 in the present embodiment is configured to be scanned at a scan speed of 40 inches/sec and perform an ink ejection operation at a timing of 600 dpi (dots/inch). After this, the printing medium P is conveyed, and an image of the next band width is printed. Such a printing apparatus may convey the printing medium P by a band width between scans or, if necessary, convey the printing medium P after multiple scans, instead of conveying the printing medium P by a band width after each single scan. The printing apparatus 1 may also perform so-called multipass printing in which an image is completed by repeating a scanning operation and a conveyance operation multiple times using different nozzles (ejection orifices) in the printing of each single image region. Specifically, in each single scan, printing may be performed based on data thinned with a predetermined mask, followed by conveyance of the printing medium P by a distance of about a 1/n band and then another scan again.

A flexible printed circuit board for supplying signal pulses for driving for ejection, signals for adjusting the temperature of the printing head 9, and the like is attached to the printing head 9. Another end of the flexible circuit board is connected to a control circuit (described later) that controls the printing apparatus 1.

A carriage belt can be used to transmit a driving force to the carriage unit 11 from the carriage motor 119. It is possible to use another driving method using, for example, a mechanism including a lead screw that is rotationally driven by the carriage motor 119 and extends in the main scanning direction and an engagement unit that is provided to the carriage unit 11 and engages the groove in the lead screw, instead of using a carriage belt.

The conveyed printing medium P is sandwiched and conveyed by the sheet feeding roller and a pinching roller to be guided to a printing position on a platen 4 (a main scanning region for the printing head 9). Normally, the orifice face of the printing head 9 in a stopped state is capped with a cap 1402 (see FIG. 14). Thus, prior to a printing operation, the printing head 9 is released from the cap 1402, thereby bringing the printing head 9 and the carriage unit 11 into a scannable state. Then, in response to data of a single scan being accumulated in a buffer, the carriage unit 11 is scanned by the carriage motor 119. As a result, a printing operation as described above is performed.

Figure 2:
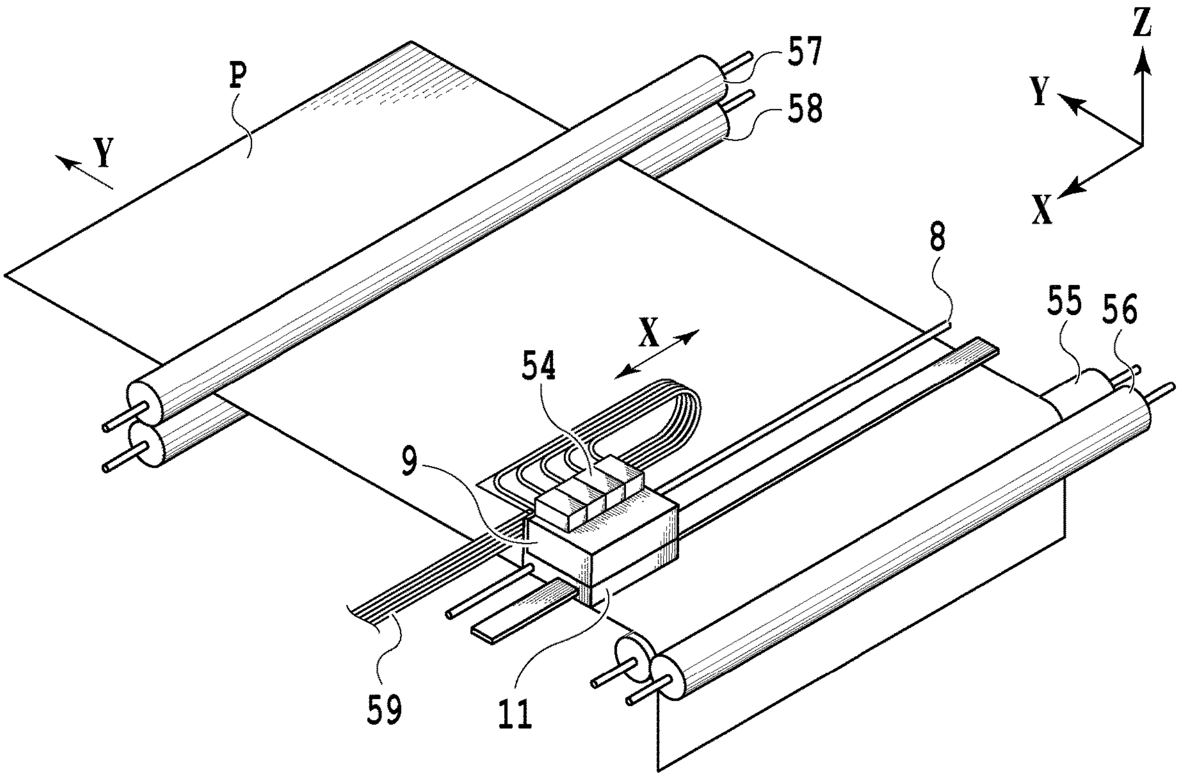
FIG. 2 is a schematic perspective view of the printing apparatus.

FIG. 2 is a schematic perspective view of an example of a configuration of the printing apparatus 1 using the printing head 9. The printing head 9 being an inkjet printing head in the present embodiment is fixed to and supported on the carriage unit 11, which is provided to the printing apparatus 1, by a positioning device and electrical contacts of the carriage unit 11. The carriage unit 11 moves in the main scanning direction, which is the direction of an arrow X, along the guide shaft 8. The printing medium P is conveyed in the conveyance direction, which is the direction of an arrow Y, by conveying rollers 55, 56, 57, and 58. Ink circulating units 54 are mounted on the printing head 9 and, as will be described later, the inks are circulated in a printing element unit. The printing apparatus 1 is provided with ink supply tubes 59 connected to ink tanks not illustrated which serve as supply sources of inks (liquids), and the inks inside the ink tanks are supplied to the printing head 9.

[Configuration of Control Unit of Printing Apparatus]

Figure 3:
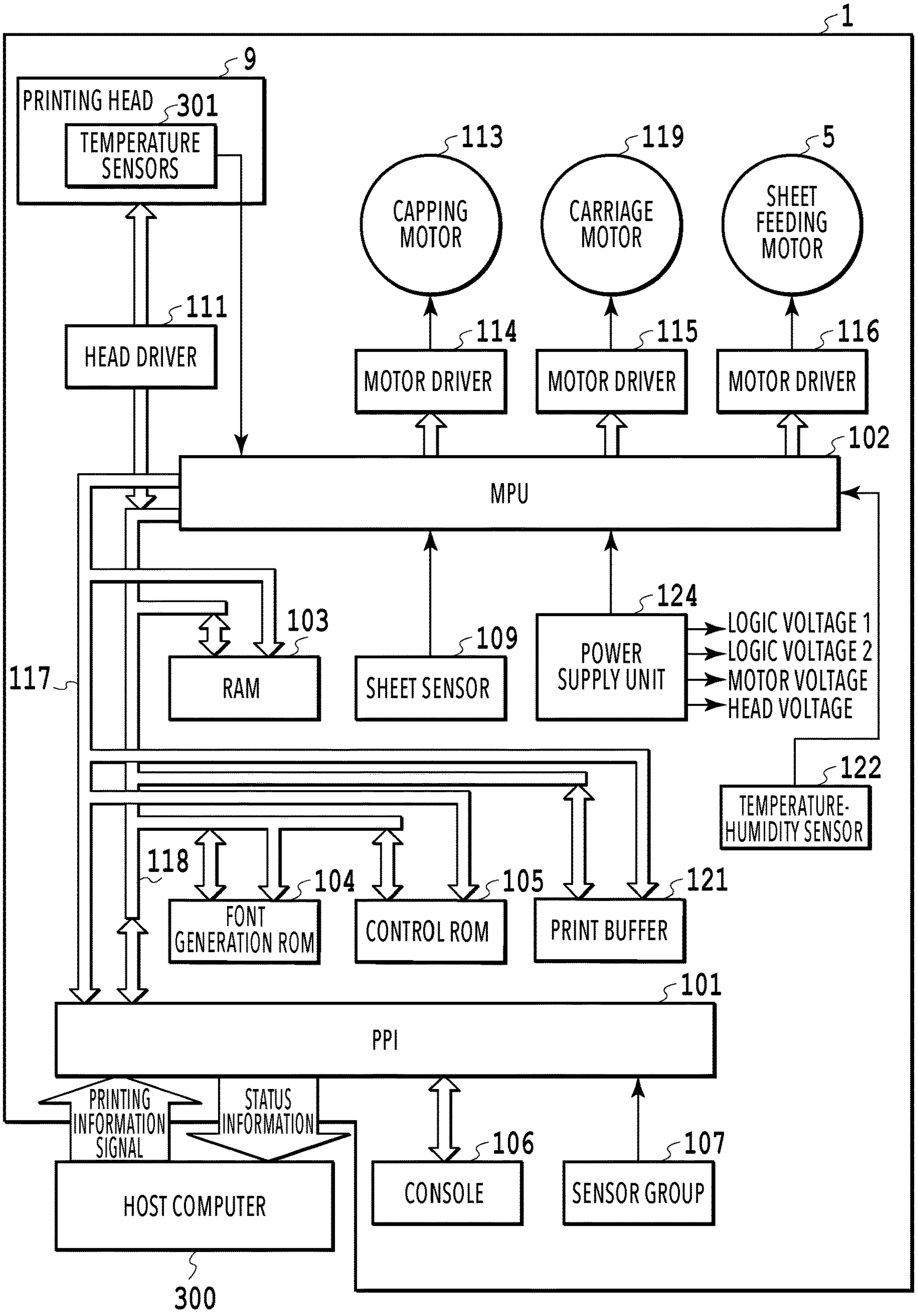
FIG. 3 is a diagram illustrating an example of a control configuration of the printing apparatus.

FIG. 3 is a diagram illustrating an example of a configuration of a control circuit in the printing apparatus 1 in the present embodiment. A programmable peripheral interface (hereinafter referred to as "PPI") 101 receives a printing information signal containing an instruction signal (command) and printing data which is sent from a host computer 300, and transfers it to a micro processing unit (MPU) 102. The PPI 101 outputs status information of the printing apparatus 1 to the host computer 300 as necessary.

A console 106 is an input-output unit including an input unit for the user to configure various settings of the printing apparatus 1, a display unit which displays messages to the user, and the like. The PPI 101 performs input and output from and to the console 106.

A sensor group 107 includes a home position sensor which detects that the carriage unit 11 (printing head 9) is at a home position, a capping sensor, and the like. The PPI 101 receives signals output from the sensor group 107.

The MPU 102 is a control unit that controls components in the printing apparatus 1 in accordance with a control program stored in a control read-only memory (ROM) 105. A random-access memory (RAM) 103 stores the receive signals. The RAM 103 is also used as a work area for the MPU 102 and temporarily stores various data.

A print buffer 121 has a capacity to hold multiple lines to be printed, and stores printing data loaded to the RAM 103 or the like. The control ROM 105 is capable of storing not only the control program but also fixed data corresponding to data to be used in the control process to be described later (e.g., data identifying the combination of temperature sensors 301 associated with the main feature of the present embodiment) and the like. These components are controlled by the MPU 102 through an address bus 117 and a data bus 118.

Motor drivers 114, 115, and 116 drive a capping motor 113, the carriage motor 119, and the sheet feeding motor 5 under control of the MPU 102, respectively.

A sheet sensor 109 is a sensor that detects the presence or absence of a printing medium, specifically, whether a printing medium has been fed to a position where the printing head 9 can perform printing.

A head driver 111 drives electric-thermal converting elements in the printing head 9 in accordance with the printing information signal. A temperature-humidity sensor 122 is a sensor that detects the environmental temperature and environmental humidity in the environment in which the main body of the printing apparatus 1 is installed. A power supply unit 124 has an alternating current (AC) adapter and a battery as a driving power supply device and supplies power to each component in FIG. 3.

The printing apparatus 1 in the present embodiment is included in a printing system including the host computer 300, which supplies the printing information signal to the printing apparatus 1. In the printing system, the host computer 300 adds necessary commands to a head section of printing data in a case of sending the printing data to the printing apparatus 1 through a parallel port, an infrared port, a network, or the like. Examples of the added commands include the type of the printing medium to print the image, the size of the printing medium, the printing quality, whether or not to perform automatic object determination, and the like. Examples of the type of the printing medium include types such as plain paper, an overhead projector (OHP) sheet, and glossy paper as well as special types of printing media such as a transfer film, cardboard, banner paper, and the like. Examples of the size of the printing medium include A0, A1, A2, B0, B1, B2, and the like. Examples of the printing quality include draft, high definition, middle definition, exaggeration of a particular color, monochrome or color, and the like. In a case of employing a configuration to apply a process liquid for improving the fixability of the inks to the printing medium, information identifying whether or not to apply that liquid or the like may be included as a command in the printing data.

Following these commands, the printing apparatus 1 reads data necessary for printing from the control ROM 105 and performs printing on the printing medium P based on the data. Examples of the data necessary for printing include data for determining the number of printing passes in a case of performing the multipass printing mentioned above, the amount of each ink to be applied to the printing medium per unit area, the printing direction, and the like. Examples also include the type of the mask(s) for the data thinning used in the case of performing the multipass printing, driving conditions based on the output values of the temperature sensors 301 in the printing head 9, the dot size, the printing medium conveyance conditions, the colors to be used, the carriage speed, and the like. Examples of the driving conditions include the form of driving pulses to be applied to heating parts, the application time, and the like.

While the printing apparatus 1 in the present embodiment will be described as having a configuration as above, the configuration of the printing apparatus 1 is merely an example intended to describe the present embodiment. It goes without saying that the method of the present embodiment can be used even in a case where, for example, the number of inks to be used in printing, the number of control units, and the like are different.

[Description of Configuration of Printing Head]

Figure 4:
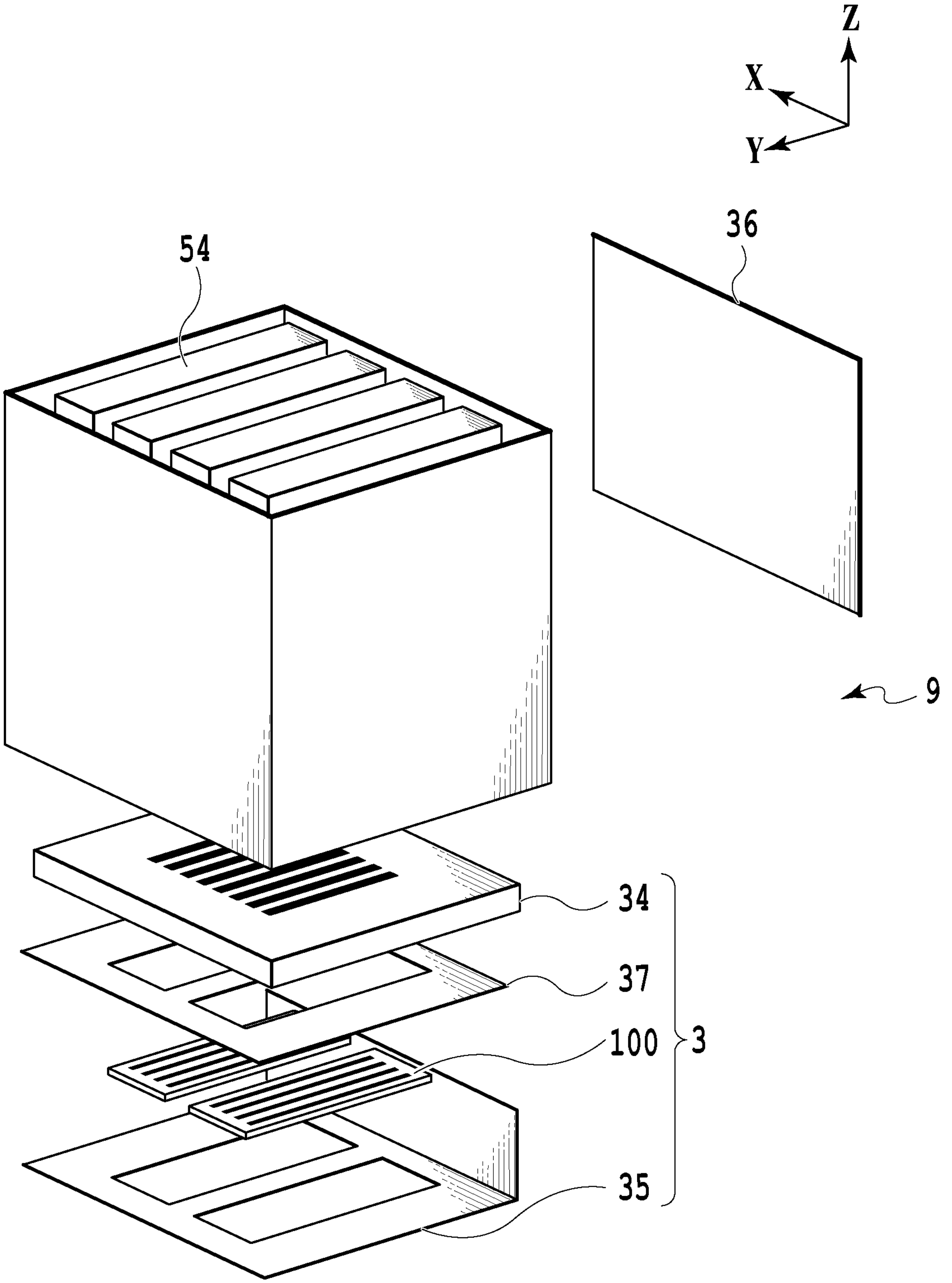
FIG. 4 is an exploded perspective view of a printing head.

FIG. 4 is an exploded perspective view of the printing head 9 in the present embodiment. The printing head 9 includes the ink circulating units 54 and a printing element unit 3 that is supplied with inks, which are printing liquids, from the ink circulating units 54 and eject the inks onto the printing medium P. The printing head 9 will be described as a liquid ejecting head capable of carrying four types of inks as the liquids to be ejected. In the printing head 9, a liquid connector insertion slot is provided for the ink supply tube 59 (see FIG. 2) for each ink, and an individual ink supply path is formed for each ink type.

The printing element unit 3 (referred to also as "ejecting unit") includes two ejecting modules 100, a first supporting member 34, a second supporting member 37, an electric wiring member (electric wiring tape) 35, and an electric contact substrate 36. The ejecting modules 100 of the printing element unit 3 each include a substrate that is made of silicon (hereinafter referred to as "silicon substrate") and an energy generating element that is provided in one surface of the silicon substrate and generates an energy to be utilized to eject liquids. In the present embodiment, multiple heating resistance elements (heaters) are used as the energy generating element. Electric wirings through which to supply power to the heating resistance elements are formed on the silicon substrate using a film forming technology. In the silicon substrate, multiple ink channels corresponding to the heating resistance elements and a pressure chamber provided with multiple ejection orifices through which to eject inks are formed using a photolithography technology. Ink supply ports and ink collection ports through which to supply and collect the inks to and from the multiple ink channels are open at the back surface of the silicon substrate. Details will be described later.

The ejecting modules 100 are adhesively fixed to the first supporting member 34, which includes ink supply ports and ink collection ports. The second supporting member 37, which has openings, is adhesively fixed to the first supporting member 34. The electric wiring member 35 is held on the second supporting member 37 so as to be electrically connected to a printing element substrate. The electric wiring member 35 applies electric signals for ejecting the inks to the ejecting modules 100.

Figure 5:
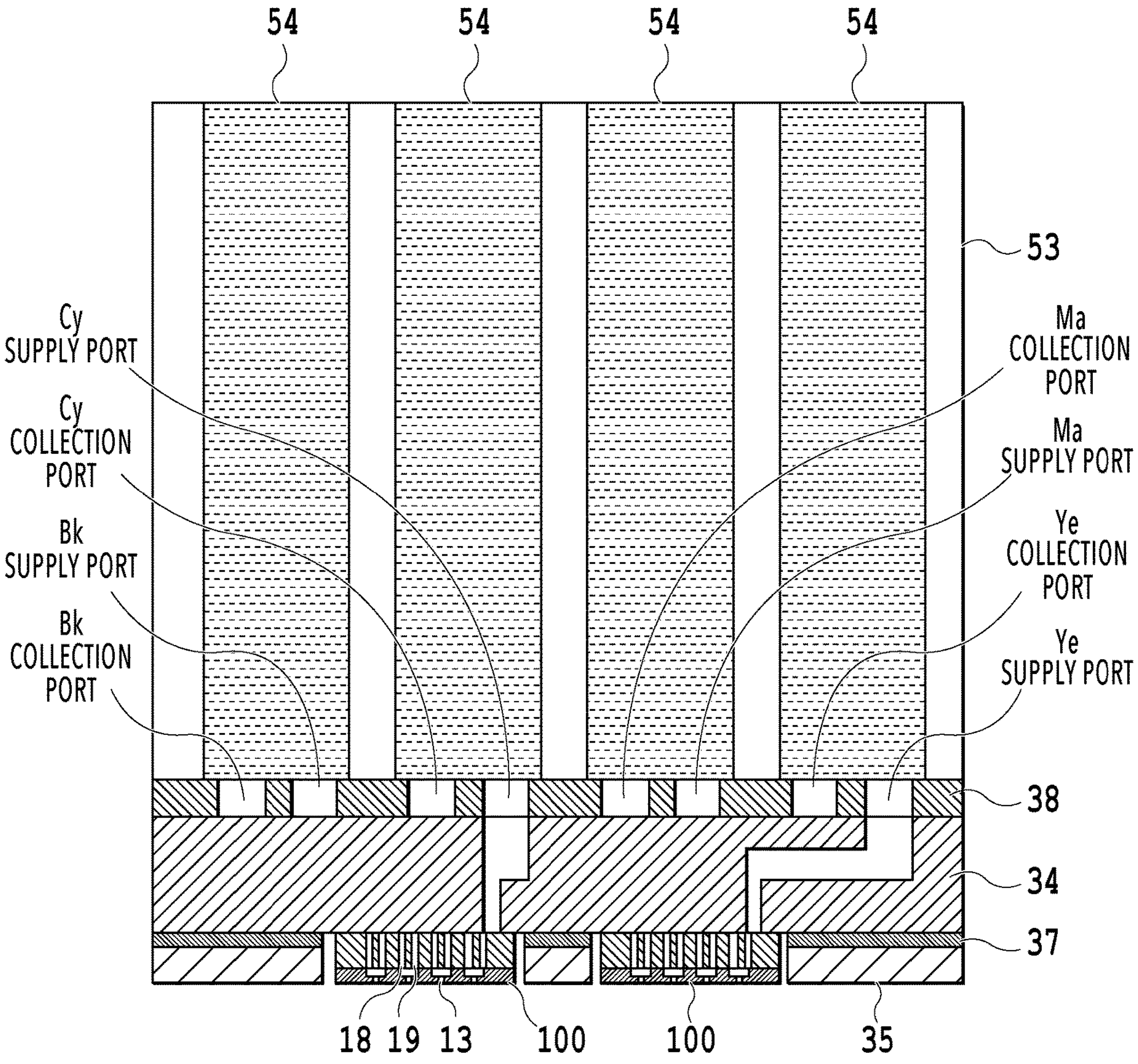
FIG. 5 is a view illustrating a channel configuration of the printing head.

FIG. 5 is a view illustrating a channel configuration of the printing head 9. In each of the two ejecting modules 100, individual supply channels 18 and individual collection channels 19 are provided such that the inks circulate passing ejection orifices 13 provided in the pressure chamber. In the first supporting member 34, channels communicating with the individual supply channels 18 and the individual collection channels 19 are widened to the width of each ink circulating unit 54 and are connected to the ink circulating units 54 of the respective colors by a joint member 38. The electric wiring member 35 is supported on the second supporting member 37 and electrically connected to the ejecting modules 100. In the joint member 38, a supply port and a collection port are formed for each color and connected to the corresponding ink circulating unit 54 to supply and collect the ink.

[Configuration of Circulation Channels in Printing Head]

Figure 6:
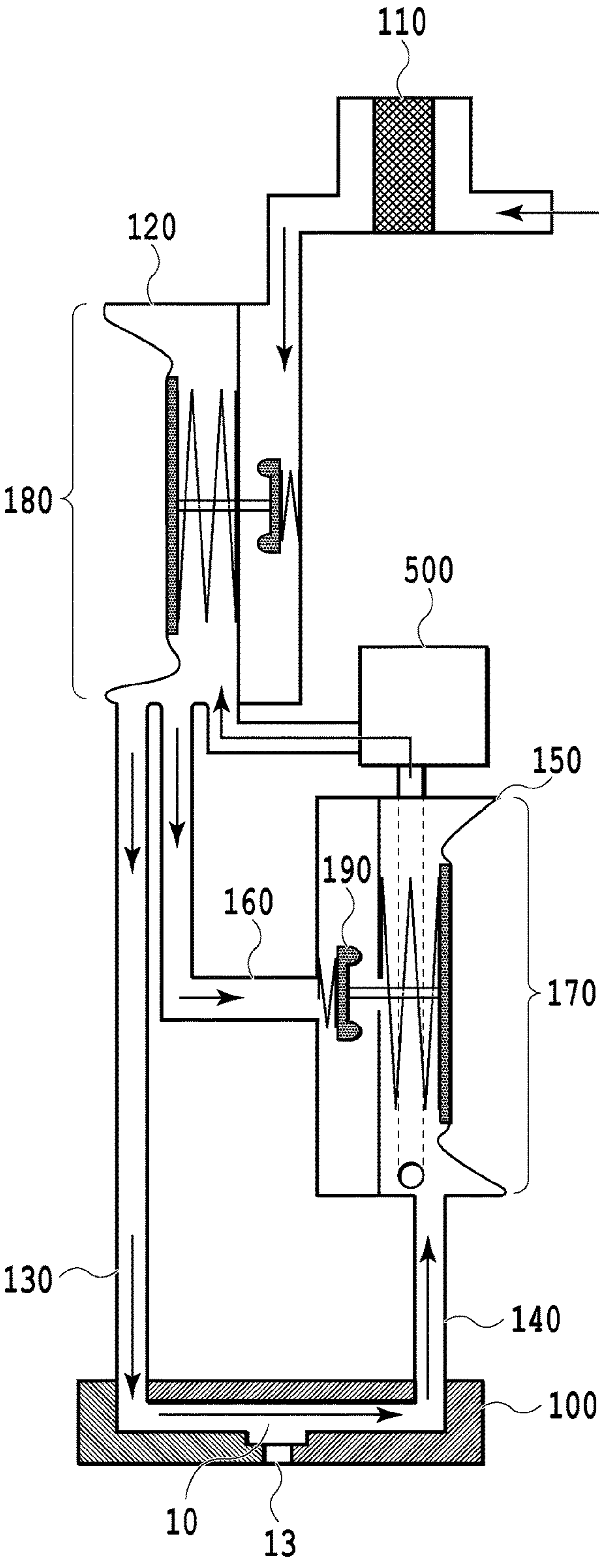
FIG. 6 is a schematic view for describing a channel configuration for one type of ink inside the printing head.

FIG. 6 is a schematic view for describing a channel configuration for one type of ink inside the printing head 9. The directions indicated by the arrows in FIG. 6 represent the directions in which the ink flows. The ink supplied from the ink tank is pressurized by a pressure pump provided in the main body of the printing apparatus 1 to pass through a foreign substance capturing filter 110 and be supplied into the printing head 9 under a positive pressure. At this time, the ink is depressurized to a predetermined ink pressure at a first liquid chamber 180 provided in a first pressure adjusting unit 120. The first liquid chamber 180 is a space to contain the ink having passed through the foreign substance capturing filter 110 and been depressurized at the first pressure adjusting unit 120. The channel configuration is such that the ink contained in the first liquid chamber 180 flows into a supply channel 130 and a bypass channel 160. The first liquid chamber 180 can be easily formed to have a large inner volume. For this reason, the first liquid chamber 180 is provided with a space in its upper portion to accumulate bubbles in order to prevent the bubbles from flowing downstream (hereinafter referred to as "bubble buffer").

The ink depressurized at the first liquid chamber 180 is supplied to the ejecting module 100 through the supply channel 130. In the ejecting module 100, the ink is supplied to a pressure chamber 10 which is a space provided with the ejection orifices 13. The ink not ejected from the ejecting module 100 is supplied to a second liquid chamber 170 through a collection channel 140. The second liquid chamber 170 is a space to contain the ink that has flowed through the bypass channel 160 or the collection channel 140 and passed through a second pressure adjusting unit 150 to undergo a pressure adjustment. A circulating pump 500 is provided downstream of the second liquid chamber 170. By actuating the circulating pump 500, the ink contained in the second liquid chamber 170 is returned to the first liquid chamber 180. The supply channel 130 in FIG. 6 is connected to the individual supply channels 18 through the joint member 38 illustrated in FIG. 5. The individual collection channels 19 are connected to the collection channel 140 through the joint member 38. Thus, in the printing head 9 in the present embodiment, a circulation channel that completes inside the printing head 9 is formed.

[Circulating Pump]

Figure 7B:
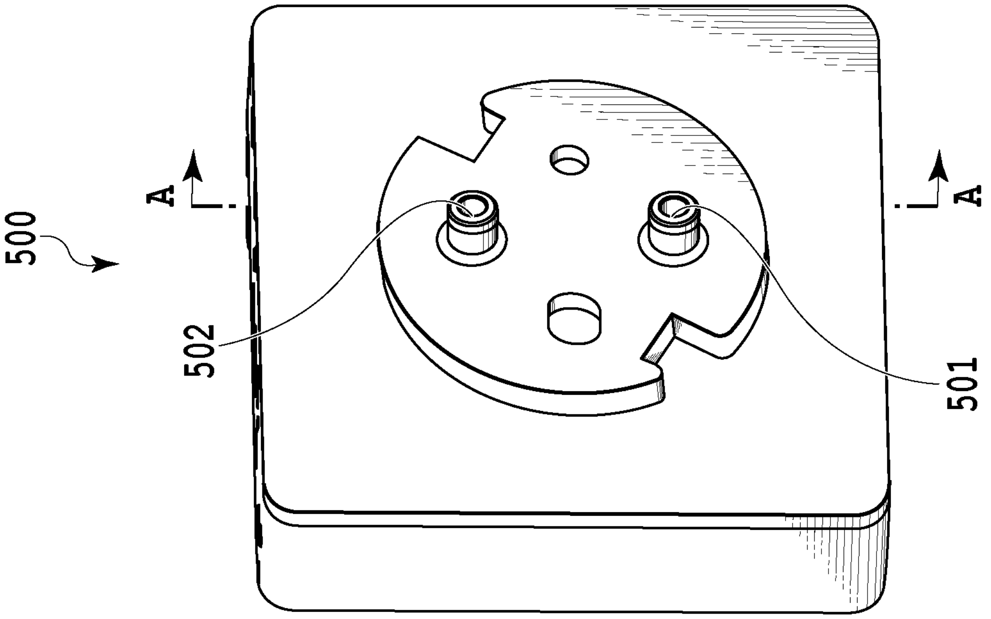
FIGS. 7A and 7B are perspective views of a circulating pump.
Figure 7A:
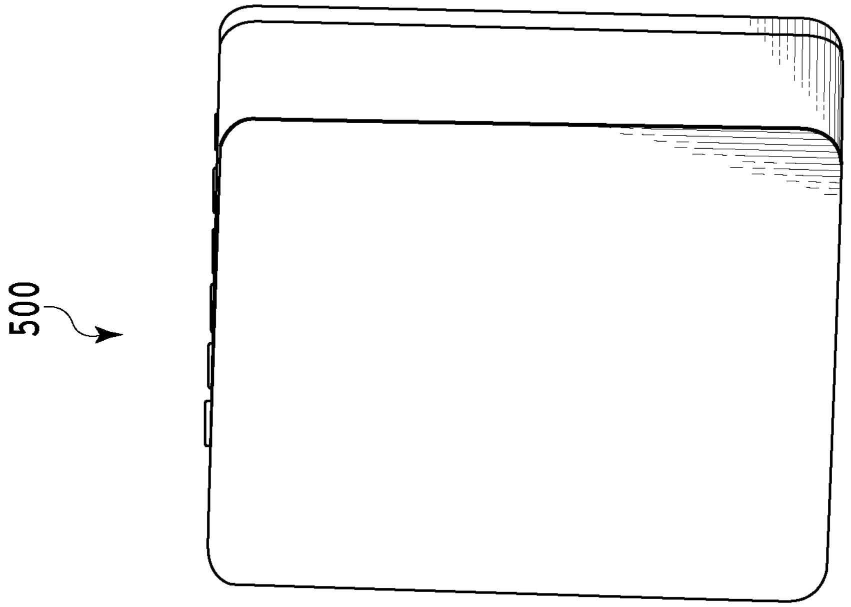

FIGS. 7A and 7B are perspective views of the circulating pump 500. The ink flows into the circulating pump 500 from an ink supply port 501 disposed on the circulating pump 500. The ink having flowed through the circulating pump 500 is discharged from an ink discharge port 502. The ink supply port 501 is connected to the collection channel 140. The ink discharge port 502 is connected to the supply channel 130 through the first liquid chamber 180.

Figure 8:
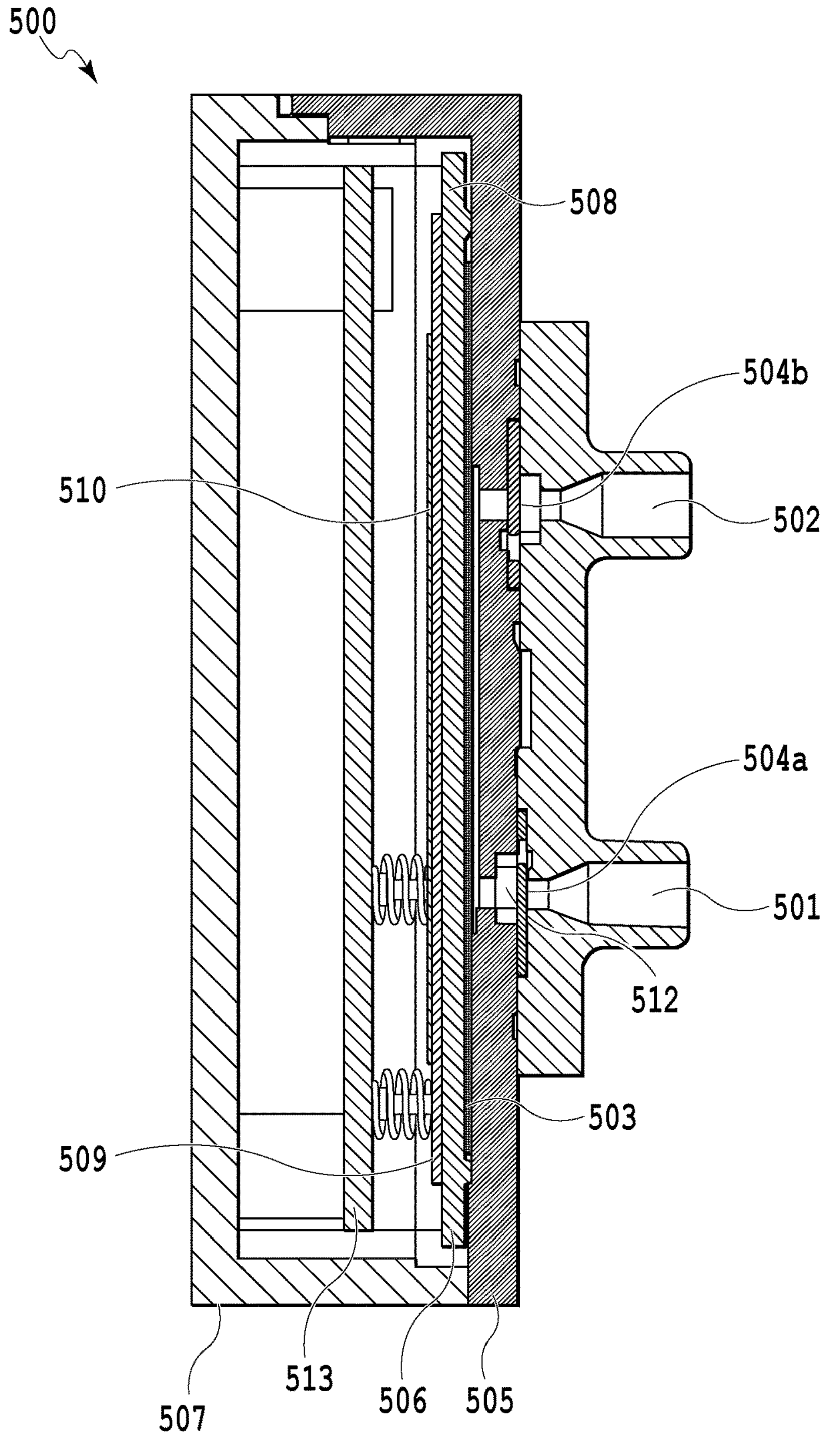
FIG. 8 is a cross-sectional view of the circulating pump.

FIG. 8 is a cross-sectional view of the circulating pump 500 taken along the A-A line in FIG. 7B. A valve 504*a* is provided between the ink supply port 501 and a pump chamber 503. One surface of the valve 504*a* abuts the ink supply port 501, and a space 512 is provided on the other surface. The valve 504*a* configured to be deformable in a direction toward the space 512 in response to depressurization of the pump chamber 503 and to be pressed against the ink supply port 501, thereby closing the ink supply port 501 in response to pressurization of the pump chamber 503. A valve 504*b* is provided between the pump chamber 503 and the ink discharge port 502. As opposed to the valve 504*a* on the ink supply port 501 side, the valve 504*b* is configured to open in response to pressurization of the inside of the pump chamber 503 and close the ink discharge port 502 in response to depressurization of the inside of the pump chamber 503. It suffices that the material of the valves 504*a* and 504*b* is one which is deformable by the internal pressure of the pump chamber 503. Examples of such a material include elastic materials such as ethylene propylene diene monomer (EPDM) and elastomers, and films and thin plates of polypropylene and the like. However, the material is not limited to these.

The pump chamber 503 is formed by joining a housing 505 and a diaphragm 506. Deformation of the diaphragm 506 changes the pressure inside the pump chamber 503.

As the diaphragm 506 is displaced toward the housing 505, thereby reducing the volume of the pump chamber 503, the pressure inside the pump chamber 503 rises. As a result, the valve 504*b* on the ink discharge port 502 side opens, so that the ink contained in the pump chamber 503 is discharged. The valve 504*a* on the ink supply port 501 side abuts the ink supply port 501, thereby preventing backflow of the ink into the ink supply port 501 from the pump chamber 503.

As the diaphragm 506 is displaced in the direction in which the volume of the pump chamber 503 expands, the pressure inside the pump chamber 503 drops. As a result, the valve 504*a* on the ink supply port 501 side opens, so that the ink is supplied into the pump chamber 503. At this time, the valve 504*b* on the ink discharge port 502 side abuts the ink discharge port 502, thereby preventing backflow of the ink into the pump chamber 503 from the ink discharge port 502.

As described above, by deforming the diaphragm 506 forming the pump chamber 503, the pressure inside the pump chamber 503 is changed to suck in the ink or to discharge the ink. By repeating the ink suction and the ink discharge, the circulating pump 500 functions as a pump that delivers the ink to the circulation channel. The control unit of the printing apparatus 1 can control the flow velocity of the ink flowing through the circulation channel in the printing head 9 by controlling the number of times to deform the diaphragm 506 per unit time (hereinafter referred to as "the number of times of driving").

[Electric Connection of Circulating Pump]

Figure 9A:
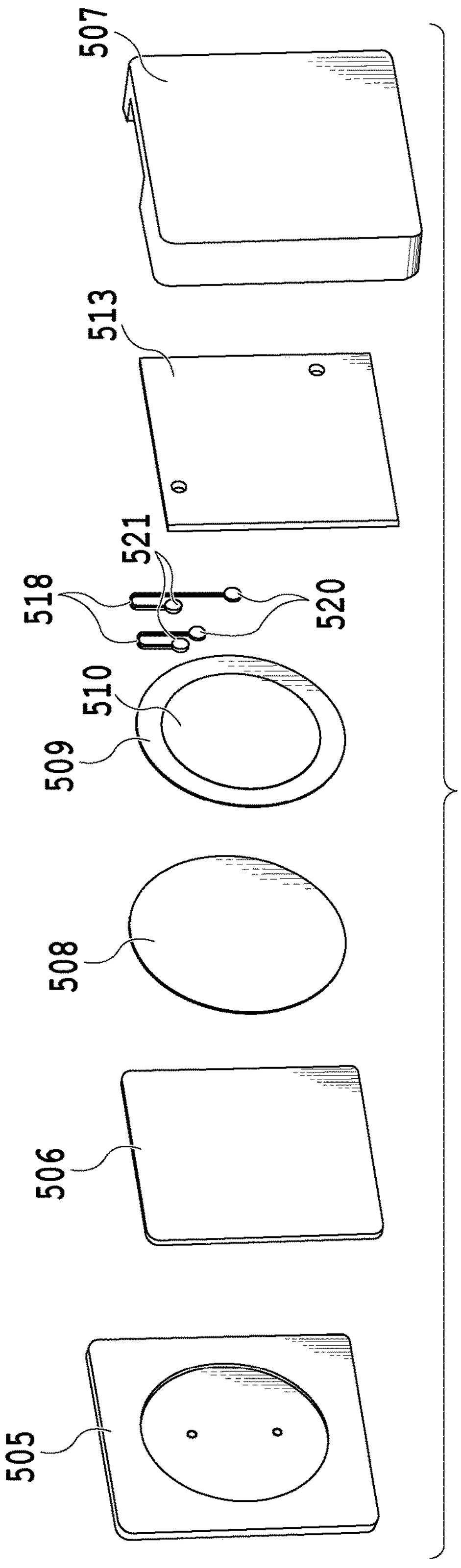
FIGS. 9A and 9B are exploded perspective views of the circulating pump.
Figure 9B:
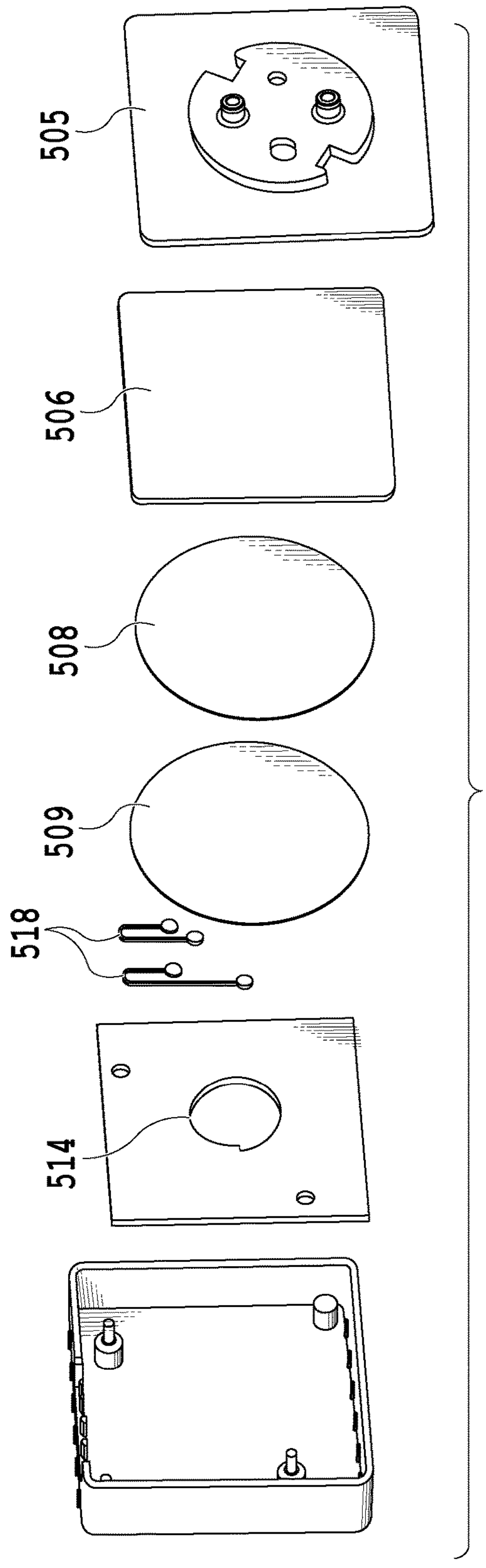

FIGS. 9A and 9B are exploded perspective views of the circulating pump 500 for describing a driving unit that displaces the diaphragm 506. As illustrated in FIGS. 9A and 9B, a vibrating plate 509 is bonded to the diaphragm 506 with an adhesive agent 508, and a piezoceramic 510 is adhesively fixed to the vibrating plate 509. The circulating pump 500 is a piezoelectric pump that is driven by deforming the diaphragm 506 via application of a voltage to the piezoceramic 510.

For the diaphragm 506, an injection moldable material, such as a modified polyphenylene ether+polystyrene (PPE+PS) or polypropylene, is used. Alternatively, a member cut out of a film or a resin plate can also be used. The material of the diaphragm 506 is not limited to these. For the vibrating plate 509, brass, stainless steel, an iron-nickel alloy, or the like is used, but the material is not limited to these. A driving circuit board 513 is provided on the side facing the piezoceramic 510. The driving circuit board 513 is supplied with power from the main body of the printing apparatus 1, and drives the circulating pump 500 by applying a voltage to the piezoceramic 510 and the vibrating plate 509.

Figure 10:
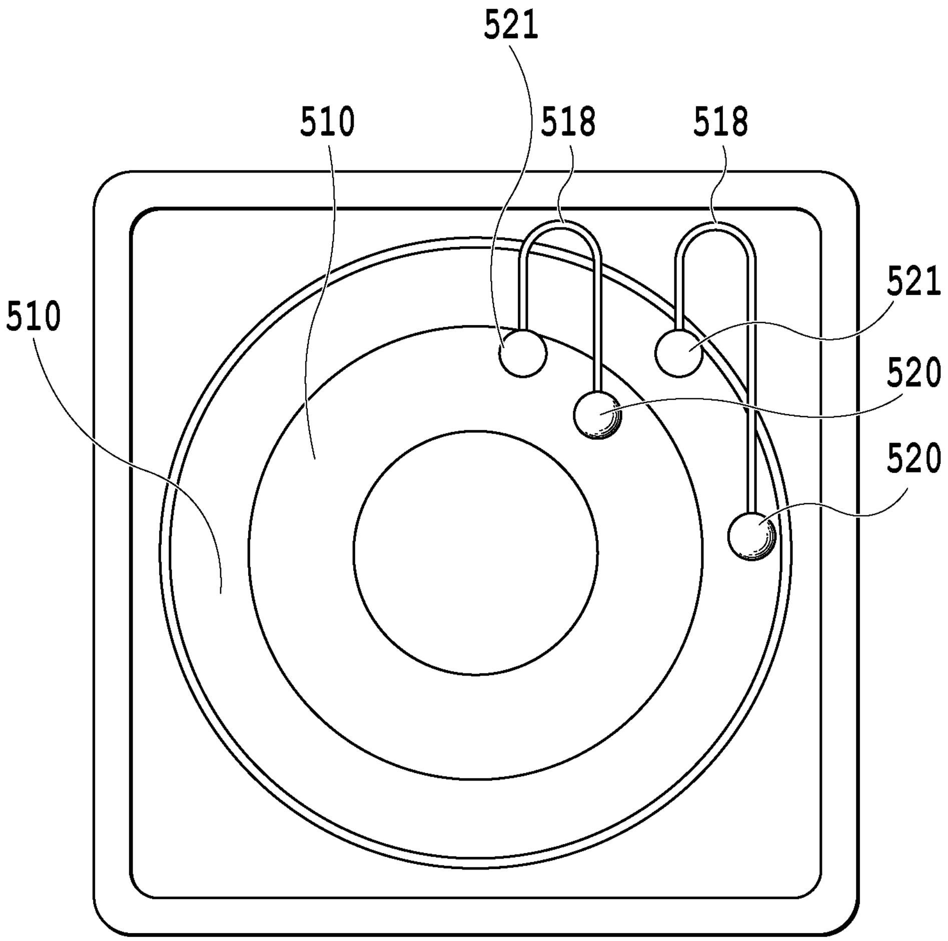
FIG. 10 is a transparent view of the circulating pump as seen through from a driving circuit board side.

FIG. 10 is a transparent view of an electric connection portion of the piezoceramic 510 as seen from the driving circuit board 513 side. The driving circuit board 513, the piezoceramic 510, and the vibrating plate 509 are electrically connected to one another by electric connection cables 518. The electric connection cables 518 are fixed and electrically connected to the driving circuit board 513 on the near side in the drawing by solder 521. The electric connection cables 518 are fixed and electrically fixed to the piezoceramic 510 and the vibrating plate 509 by solider 520. The vibrating plate 509 is connected to a ground (GND) wiring of the driving circuit board 513 by the corresponding electric connection cable 518. The piezoceramic 510 is connected to an AC voltage output unit of the driving circuit board 513 by the corresponding electric connection cable 518. By connecting the vibrating plate 509 to GND and applying an AC voltage to the piezoceramic 510, the piezoceramic 510 is stretched and shrunk to deform the diaphragm 506. In this way, the internal pressure of the pump chamber 503 is changed to suck in and discharge the ink.

The driving circuit board 513 is electrically connected to the electric contact substrate 36 (see FIG. 4) by a cable, and the electric contact substrate 36 is provided with electric connection terminals for driving the pumps.

In the state where the printing head 9 is mounted on the carriage unit 11, electric signals from an electric contact portion on the carriage unit 11 side are input into the electric connection terminals for driving the pumps, and the electric signals are input into the driving circuit board 513 through the electric contact substrate 36.

By providing the electric contact substrate 36 with the electric connection terminals for driving the pumps as described above, the circulating pump 500 can be driven by applying a predetermined voltage to the corresponding electric connection terminal even in a state where the printing head 9 is detached from the carriage unit 11.

[Number of Times of Driving of Circulating Pump and Degree of Bubble Discharge]

In a case where bubbles get in the pump chamber 503 of the circulating pump 500, the bubbles expand and shrink when the diaphragm 506 is deformed. This may decrease the change in the pressure on the liquid inside the pump chamber 503. Next, effects of the number of times of driving of the circulating pump 500 per unit time and bubbles will be described.

Figure 11A:
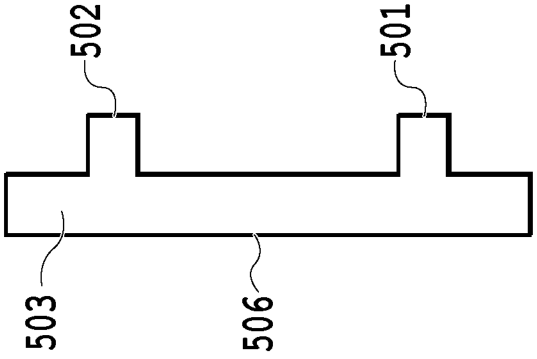
FIGS. 11A to 11C are diagrams schematically illustrating a pump chamber in the circulating pump.
Figure 11B:
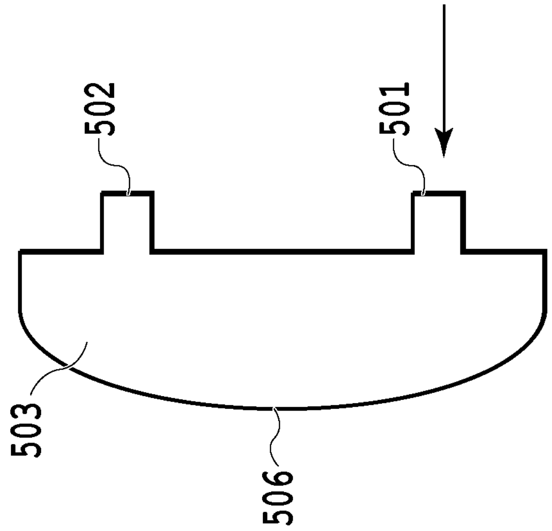
Figure 11C:
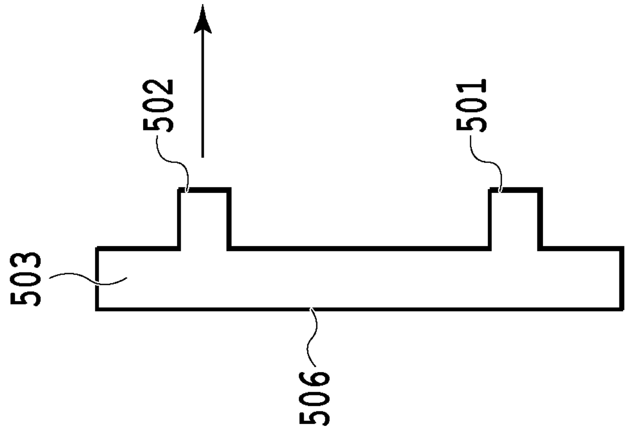

FIGS. 11A to 11C are conceptual diagrams schematically illustrating the pump chamber 503 of the circulating pump 500 in an enlarged fashion. In FIGS. 11A to 11C, the pump chamber 503 is illustrated with some components such as the valves 504*a* and 504*b* omitted. FIG. 11A is a diagram illustrating the pump chamber 503 before deformation of the diaphragm 506. No pressure change has occurred in the pump chamber 503 in FIG. 11A. FIG. 11B is a diagram illustrating the pump chamber 503 in a state where the diaphragm 506 has been deformed in the direction in which the volume of the pump chamber 503 expands. A negative pressure has been generated inside the pump chamber 503 in FIG. 11B. The ink is drawn into the pump chamber 503 from the ink supply port 501 on the lower side according to the generated negative pressure. The direction of the arrow in FIG. 11B indicates the direction in which the ink flows.

FIG. 11C illustrates the pump chamber 503 in a state where the diaphragm 506 has returned to the original shape from the state of FIG. 11B. The inside of the pump chamber 503 in FIG. 11C is in a pressurized state, so that the ink inside the pump chamber 503 is pushed out and discharged from the ink discharge port 502 on the upper side. By repetitively deforming the diaphragm 506 as illustrated in FIG. 11B and bringing the diaphragm 506 back to the original state as illustrated in FIG. 11C, the circulating pump 500 functions as a pump that pushes out the ink into the circulation channel. The operation of deforming the diaphragm 506 and bringing it back to the original state illustrated in FIGS. 11A to 11C is performed by driving the circulating pump 500 once. The number of times of driving of the circulating pump 500 per unit time will be referred to as "the number of times of driving", and the number of times of driving per second will be indicated with Hz.

Figure 12A:
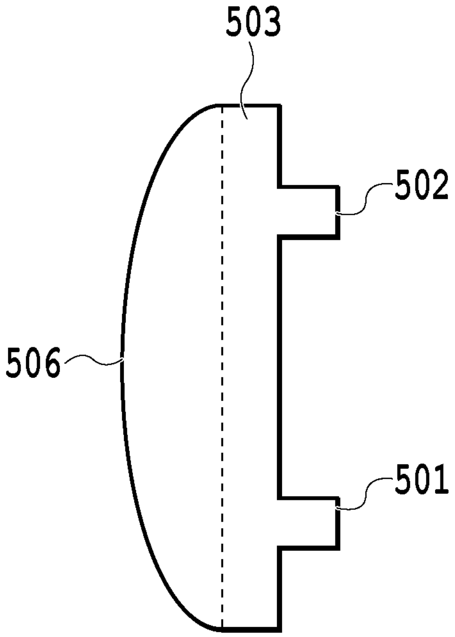
FIGS. 12A and 12B are diagrams for describing amounts of deformation of a diaphragm representing a difference in the number of times of driving.
Figure 12B:
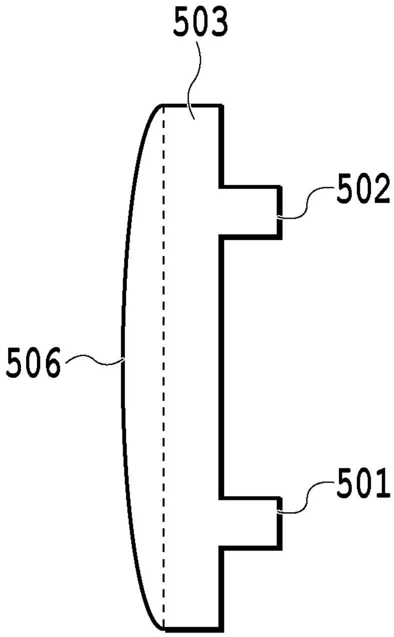

FIGS. 12A and 12B are diagrams for describing the amount of deformation of the diaphragm 506 due to a difference in the number of times of driving. The dotted lines in FIGS. 12A and 12B indicate the shape of the diaphragm 506 before deformation for the sake of description. FIG. 12A illustrates the amount of deformation of the diaphragm 506 occurring in response to driving the circulating pump 500 once in a case where the number of times of driving per second is small. For example, FIG. 12A illustrates the amount of deformation of the diaphragm 506 in a case where the number of times of driving per second is 15. FIG. 12B illustrates the amount of deformation of the diaphragm 506 occurring in response to driving the circulating pump 500 once in a case where the number of times of driving per second is larger than that in FIG. 12A. For example, FIG. 12B illustrates the amount of deformation of the diaphragm 506 in a case where the number of times of driving per second is 60. As illustrated in FIGS. 12A and 12B, in a case where the number of times of driving is large, the circulating pump 500 is driven so as to reduce the amount of deformation of the diaphragm 506. This is due to a phenomenon in which, in the case where the number of times of driving is large, the next driving needs to be performed before the diaphragm 506 finishes deformation and accordingly the amount of deformation of the diaphragm 506 in a single driving operation becomes small.

For this reason, in the case where the number of times of driving is large, the amount of the negative pressure to be generated in the pump chamber 503 in a single driving operation decreases. However, since the number of times of driving per unit time is large, the circulation flow rate of the ink through the circulation channel can be increased in a case where no bubble is generated. As a result, the flow rate of the ink through the circulation channel is low in the case where the number of times of driving per second is small as illustrated in FIG. 12A, and the flow rate of the ink through the circulation channel is high in the case where the number of times of driving per second is large as illustrated in FIG. 12B.

Figure 13A:
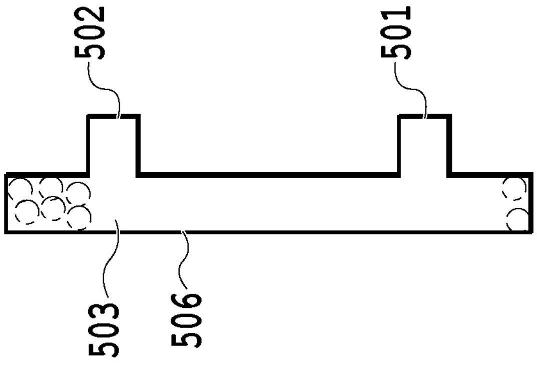
FIGS. 13A to 13C are diagrams illustrating the inside of the pump chamber in cases where bubbles have entered the pump chamber.
Figure 13B:
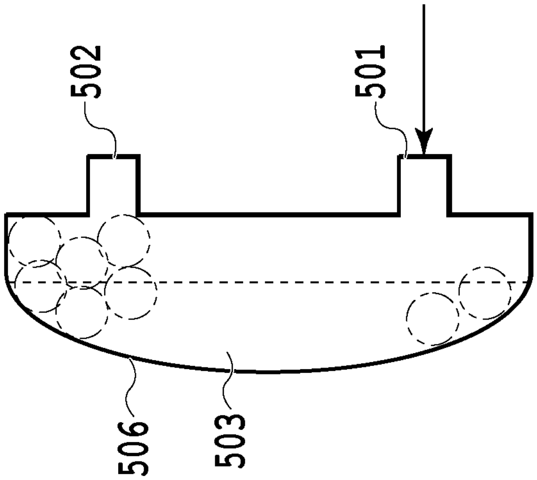
Figure 13C:
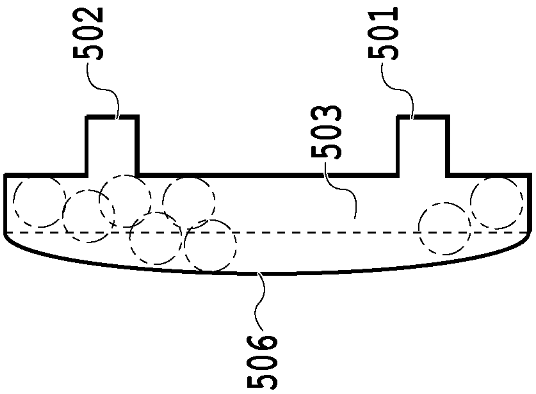

FIGS. 13A to 13C are diagrams illustrating the inside of the pump chamber 503 in cases where bubbles have entered the pump chamber 503. The circles in FIGS. 13A to 13C represent the bubbles. FIG. 13A illustrates a state where bubbles have been generated in the pump chamber 503 before deformation of the diaphragm 506. FIG. 13B is a diagram illustrating the pump chamber 503 in which bubbles are present in a case where the number of times of driving of the circulating pump 500 is small and the amount of deformation of the diaphragm 506 in a driving operation is large as in FIG. 12A. FIG. 13C is a diagram illustrating the pump chamber 503 in which bubbles are present in a case where the number of times of driving is large and the amount of deformation of the diaphragm 506 is small as in FIG. 12B.

In a case where a negative pressure is generated inside the pump chamber 503 by deforming the diaphragm 506 with bubbles present in the pump chamber 503, that negative pressure causes the bubbles to expand. The bubble expansion occurs both in the case where the number of times of driving of the circulating pump 500 is small as illustrated in FIG. 13B and in the case where the number of times of driving of the circulating pump 500 is large as illustrated in FIG. 13C. Here, as illustrated in FIG. 13C, in the case where the number of times of driving of the circulating pump 500 is large and accordingly the amount of deformation of the diaphragm 506 is small, the negative pressure generated in a single driving operation is small. As a result, only a negative pressure that can expand the bubbles is generated. Specifically, in the case where bubbles have been generated, the change in the pressure on the ink inside the pump chamber 503 is small if the number of times of driving of the circulating pump 500 is large, thus reducing the amount of the ink flowing into the pump chamber 503 and also reducing the amount of the ink discharged from the pump chamber 503. This leads to a failure to draw the ink in from the ink supply port 501 and makes it impossible for the circulating pump 500 to function as a pump to circulate the ink inside the circulation channel. As a result, the flow rate of the ink through the circulation channel drops.

On the other hand, in the case where the amount of deformation of the diaphragm 506 is large as in FIG. 13B, the negative pressure generated inside the pump chamber 503 is so high that not only the bubbles expand but also the ink is drawn in from the ink supply port 501. Accordingly, the ink is discharged as much as the amount drawn in as the diaphragm 506 returns to the original shape, so that bubbles near the ink discharge port 502 are discharged along with the ink. The discharged bubbles accumulate in the space provided as a bubble buffer in an upper portion of the first liquid chamber 180 in the printing head 9 illustrated in FIG. 6. Thus, the bubbles discharged from the pump chamber 503 will not circulate through the circulation channel in the printing head 9 again. This prevents the bubbles from changing the flow rate of the ink inside the printing head 9.

As described above, in the present embodiment, the number of times of driving of the circulating pump 500 is controlled to be small in a case where many bubbles are assumed to have been generated inside the printing head 9, in particular, inside the pressure chamber near ejection orifices and the ink circulation channel in the printing head 9. By making the number of times of driving small, the amount of deformation of the diaphragm 506 becomes large, thereby allowing movement of the bubbles inside the circulation channel.

[Cleaning Method by Ink Suction and Generation of Bubbles]

Figure 14:
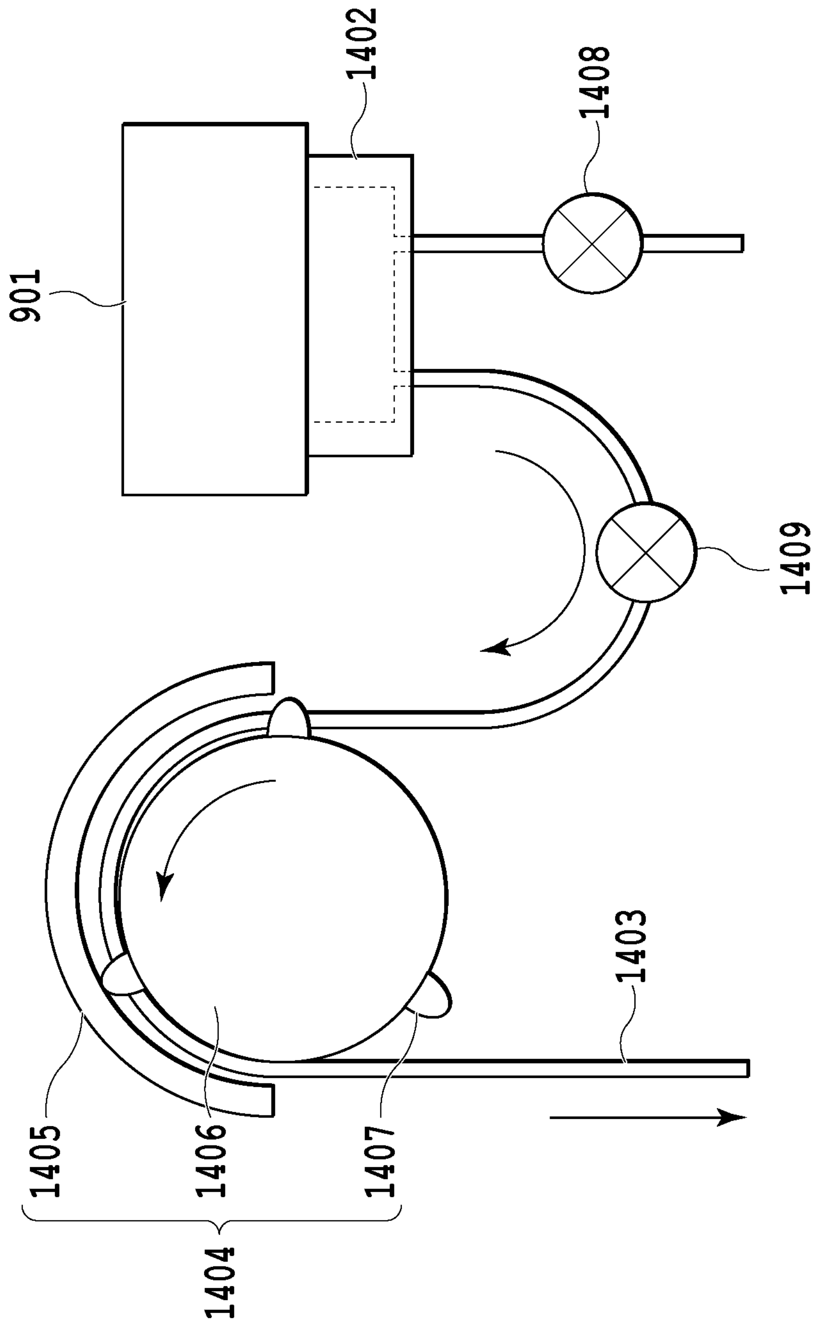
FIG. 14 is a view for describing a method to solve nozzle clogging by suction from nozzles.

FIG. 14 is a view for describing a method to solve nozzle clogging by drawing out a large amount of the inks from the nozzles (ejection orifices) in the printing head 9 via application of a negative pressure to the nozzles. The printing apparatus 1 has the cap 1402, which covers the ejection orifice surface of the printing head 9, and a suction tube 1403 connected at one end to the cap 1402 and connected at the other end to a waste ink absorber not illustrated as a suction mechanism to perform suction. The printing apparatus 1 further has a suction pump 1404 disposed on the suction tube 1403 as the suction mechanism. The suction pump 1404 includes a tube guide 1405, a shaft 1406, and multiple rollers 1407 disposed on the periphery of the shaft 1406.

In one ink suction method, the shaft 1406 of the suction pump 1404 is rotated in the direction of the arrow in FIG. 14, so that the rollers 1407 sequentially squish the portion of the suction tube 1403 held by the tube guide 1405 and thereby depressurize the inside of the suction tube 1403. Thus, a negative pressure is generated inside the cap 1402 covering the ejection orifice surface of the printing head 9. As a result, a suction operation of sucking the inks out of the printing head 9 (normal suction) is performed. The suction amount in this suction operation can be determined based on a preset number of rotations and rotational speed of the rollers 1407. The driving of the suction pump 1404 is stopped after the suction pump 1404 is rotated a predetermined number of times.

After the suction operation, a cap opening operation to separate the cap 1402 from the ejection orifice surface is performed. Alternatively, an air release valve 1408 with an air release path provided to the cap 1402 is opened to make the inside of the cap 1402 communicate with the atmospheric pressure.

The suction mechanism in the present embodiment includes a choke valve (on-off valve) 1409 disposed at an intermediate portion of the channel formed by the suction tube 1403. The choke valve 1409 is a valve for switching between a state where the channel between the cap 1402 and the suction pump 1404 is open (open state) and a state where the channel between the cap 1402 and the suction pump 1404 is not open (closed state).

In response to driving the suction pump 1404 by rotating the shaft 1406, on which the rollers 1407 are disposed, in the direction of the arrow with the choke valve 1409 in the closed state, the portion of the suction tube 1403 on the suction pump 1404 side from the choke valve 1409 is depressurized, thus generating a high negative pressure. After rotating the suction pump 1404 a predetermined number of times, the choke valve 1409 is switched to the open state to perform a suction operation of sucking the inks out of the printing head 9 through the cap 1402. This suction operation will be referred to as “choking suction”. The choking suction allows suction at a negative pressure raised by the choking, and can therefore suck the inks out of the printing head 9 with a stronger suction force than in the normal suction, which is a suction operation without using the choke valve 1409. While a solenoid valve or the like may be used as the choke valve 1409, a valve that presses the tube may be used from the viewpoint of cost and size.

In a case of supplying the inks to the printing head 9 after performing a suction operation by the choking suction, the inks are swiftly supplied into the printing head 9. This may lead to generation of many bubbles inside the circulation channels formed in the printing head 9. The higher the negative pressure is set to enhance the recovery performance, the higher is the possibility of generating many bubbles.

[Flowchart of Cleaning Sequence and Image Printing Operation]

As described above, after a suction operation can be an example of the case where many bubbles are assumed to be present inside the printing head 9. In particular, in a case of performing choking suction, the inks rapidly pass through fine channels inside the printing head 9, so that many bubbles are generated inside the printing head 9. To address this, in the present embodiment, a process to suppress the effect of bubbles is performed in a cleaning sequence preceding an image printing operation.

Figure 15:
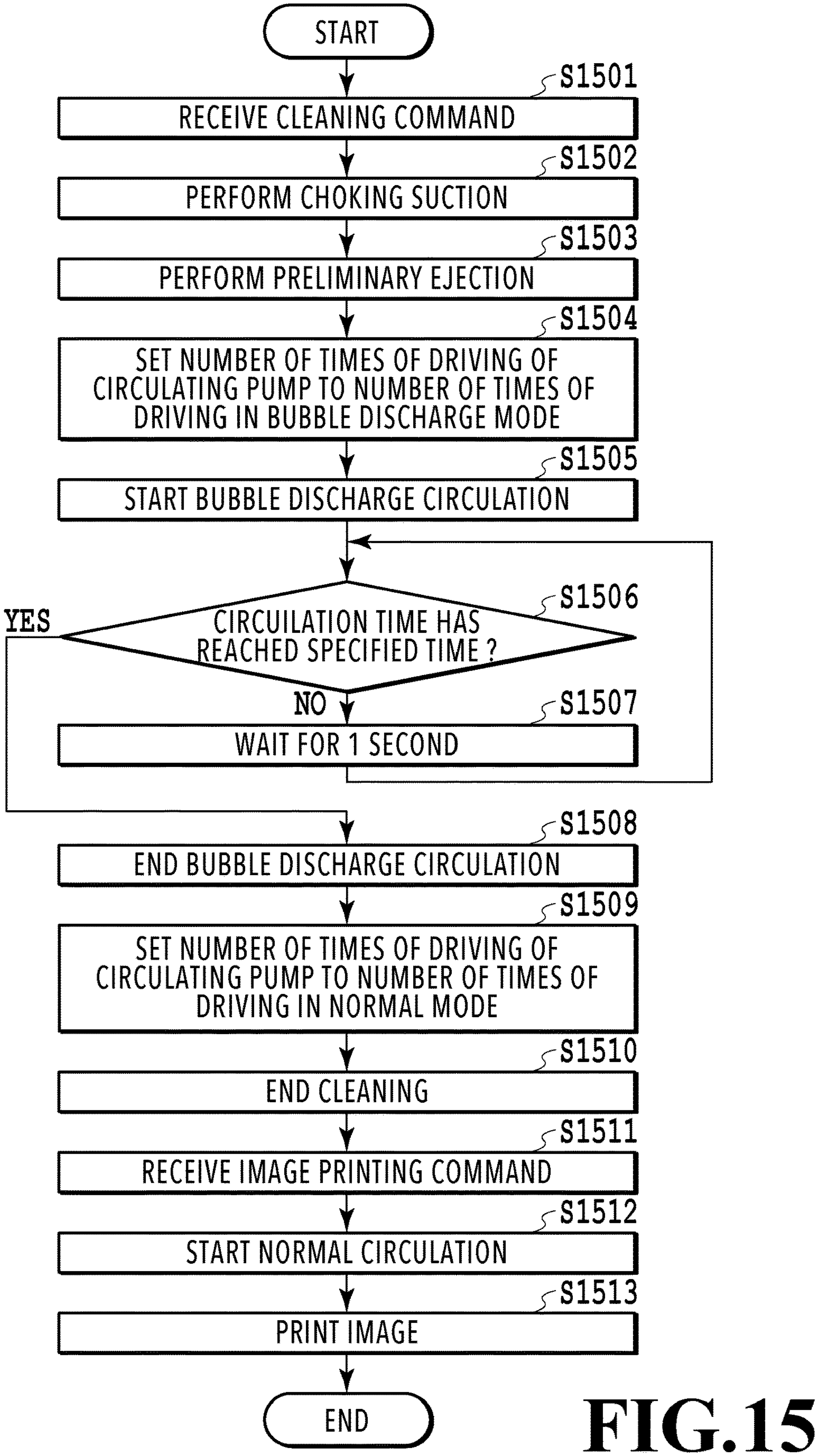
FIG. 15 is a flowchart for describing a cleaning sequence and a printing operation.

FIG. 15 is a flowchart for describing processing for a cleaning sequence intended to solve clogging of the nozzles (ejection orifices) in the printing head 9 and an image printing operation. In the present embodiment, control is performed in the cleaning sequence so as to perform bubble discharge circulation which is circulation of the inks in the circulation channels to discharge bubbles.

The flowchart of FIG. 15 will be described on the assumption that the MPU 102 performs the series of processes illustrated in the flowchart by loading program code stored in the control ROM 105 to the RAM 103 and executing it. Alternatively, functions to perform some or all of the steps in FIG. 15 may be implemented with hardware such as an ASIC or an electronic circuit. Meanwhile, the symbol “S” in the description of each process means a step in the flowchart. This applied also to the subsequent flowchart.

In S1501, the MPU 102 receives a cleaning command. The cleaning command is received in a case where the user intentionally directs that cleaning should be performed. Alternatively, cleaning may be automatically performed for protection of the printing apparatus 1. In the case of automatically performing cleaning, a cleaning command is received if conditions for cleaning are met.

In S1502, the MPU 102 performs a process of sucking the inks out of the ejection orifices by using the suction mechanism as described with reference to FIG. 14. In this step, choking suction is performed, for example.

In S1503, the MPU 102 causes the printing head 9 to perform preliminary ejection of the inks. In a case of utilizing a negative pressure inside the cap 1402 to draw the inks out of the ejection orifices in the printing head, the cap 1402 may be filled with various inks and mixed inks may get attached to the ejection orifices. The preliminary ejection is performed to solve the attachment of mixed inks to the ejection orifices.

In S1504, the MPU 102 sets a number of times of driving fr of each circulating pump 500 to a number of times of driving fr1 in a bubble discharge mode. As described earlier, in the present embodiment, the number of times of driving of the circulating pump 500 is the number of times the piezoceramic 510 deforms the diaphragm 506 per unit time.

FIG. 16 is a table illustrating the numbers of times of driving of the circulating pump in the bubble discharge mode and a normal mode. In FIG. 16, each number of times of driving of the circulating pump 500 is described in units of Hz as the number of operations per second. The number of times of driving fr1 of the circulating pump 500 in the bubble discharge mode is 15 per second (15 Hz), for example. The normal mode is a mode set in a case of performing an image printing operation. The number of times of driving in the bubble discharge mode is set to be smaller than the number of times of driving in the normal mode in order to make the amount of deformation of the diaphragm 506 large to thereby generate a high negative pressure in a single driving operation.

The number of times of driving in the bubble discharge mode is not limited to a single number of times. A number of times of driving selected from among multiple numbers of times of driving that are less than or equal to a predetermined number of times of driving (e.g., less than or equal to 15 Hz) may be set as the number of times of driving in the bubble discharge mode. Alternatively, control that sets the number of times of driving in the bubble discharge mode by combining those multiple numbers of times of driving as appropriate may be performed.

In S1505, the MPU 102 drives each circulating pump 500 to start bubble discharge circulation which is circulation of the ink inside the corresponding circulation channel in the bubble discharge mode.

In S1506, the MPU 102 determines whether a time T since the start of the bubble discharge circulation has reached a specified time T1. For example, T1=60 seconds. If the MPU 102 determines that the time T has not reached the specified time T1 (NO in S1506), the MPU 102 advances the processing to S1507.

In S1507, the MPU 102 waits for a predetermined time while keeping the circulating pump 500 driven in the bubble discharge mode to continue the operation of the bubble discharge circulation. The predetermined time is 1 second, for example. After waiting for the predetermined time, the MPU 102 returns to S1506 and determines whether the specified time T1 has been reached again.

If the time T since the start of the bubble discharge circulation has reached the specified time T1 (YES in S1506), the MPU 102 advances the processing to S1508. In S1508, the MPU 102 ends the operation of the bubble discharge circulation by stopping driving the circulating pump 500. The MPU 102 then advances the processing to S1509.

In S1509, the MPU 102 sets a number of times of driving fr of each circulating pump 500 to a number of times of driving fr2 in the normal mode. As illustrated in FIG. 16, the number of times of driving fr2 in the normal mode is 60 is per second (60 Hz).

The cleaning operation ends with the processes of S1501 to S1509, and a cleaning finishing operation is performed in S1510. For example, in a case where a user interface (UI) screen indicating that cleaning is being performed has been displayed during the cleaning, the MPU 102 performs a process of finishing displaying that UI screen and bringing the screen back to a normal screen in S1510. Alternatively, the MPU 102 may perform no special process in S1510.

In S1511, the MPU 102 receives an image printing command, and starts a printing data generating process necessary for image printing, such as image processing. The printing data generating process performed in S1511 may be any process as long as it is a process for performing a typical image printing operation, and detailed description thereof is therefore omitted.

In S1512, the MPU 102 starts an ink circulating operation by driving the circulating pump 500 at the number of times of driving fr2 (60 Hz) set in S1509.

In S1513, the MPU 102 prints the image by controlling the printing head 9 and the like. This ends the flow from the cleaning to the image printing operation.

As described above, in the present embodiment, a process of moving bubbles present inside the printing head 9 into the bubble buffer provided in an upper portion of the first liquid chamber 180 is performed in the bubble discharge circulation process in S1505 to S1508. This prevents lowering of the degree of bubble discharge from the circulation channel (dischargeability of bubbles) that would otherwise occur due to increasing the number of times of driving of the circulating pump to raise the circulation flow rate. Thus, in a situation where many bubbles are present after ink suction out of the ejection orifices, the printing apparatus 1 in the present embodiment can perform circulation control suitable for the situation where many bubbles are present. This prevents poor ink circulation due to bubbles inside the circulation channel, and therefore enables stable printing operations.

In inkjet printing heads, the moisture in the inks evaporates at the liquid surfaces of the inks at the nozzle (ejection orifice) opening portions in a case where the inkjet printing heads continue to be in a non-ejection state. Consequently, the viscosity of the inks at the nozzle opening portions rises. This may deteriorate the ink ejection performance. Thus, the printing apparatus 1 performs control such as preliminary ejection to discharge the inks with the raised viscosity. The circulating pumps 500 are disposed in the printing head 9 in the present embodiment. This enables circulation of the inks inside the printing head 9. In the printing head 9 in the present embodiment, the ink circulation allows the inks to be replaced with fresh inks before their viscosity rises. This prevents deterioration in ejection performance.

It is known that the higher the circulation flow rate of the inks, the higher the effect of circulating the inks inside the printing head 9 to prevent the ejection performance deterioration. At the time of performing a printing operation, the circulation flow rate of the inks needs to be controlled to be high. For this reason, in the present embodiment, after performing an operation that causes generation of many bubbles inside the printing head 9, such as cleaning, control is performed to drive each circulating pump 500 at a number of times of driving suitable for bubble discharge before performing the printing operation. Then, before performing the printing operation, control is performed to change the number of times of driving so as to achieve an ink circulation flow rate suitable for the printing operation and drive the circulating pump 500 at that number of times of driving. As described above, in the present embodiment, the number of times of driving of each circulating pump 500 in the printing head 9 is controlled according to the purpose. This makes it possible to implement a printing operation at an ink circulation flow rate suitable for the printing operation without impairing the performance of the circulating pump 500.

Incidentally, the description has been given on the assumption that the cleaning sequence in FIG. 15 is performed utilizing choking suction involving a valve closing operation. The choking suction can increase the intensity of recovery with the operation of temporarily raising the suction pressure. However, raising the suction force to increase the intensity of recovery may increase the amount of the inks to be sucked out and thus increase the amount of the waste inks. Thus, the printing apparatus 1 may be configured to be capable of performing multiple cleaning sequences corresponding respectively to multiple intensities of recovery. The amount of bubbles to be generated tends to increase the higher the intensity of recovery by cleaning is. For this reason, the specified time T1 for which to perform bubble discharge circulation after cleaning that allows a high intensity of recovery may be controlled to be longer than that of bubble discharge circulation performed after cleaning that allows a low intensity of recovery. For example, in a case where the cleaning is performed in S1502 by normal suction, which applies a lower suction force than choking suction, the specified time T1 for which to drive each circulating pump 500 in the bubble discharge mode may be set to be shorter than 60 seconds. This makes it possible to implement bubble discharge control suitable for the amount of bubbles to be generated corresponding to the intensity of recovery by cleaning.

The above description has been given taking an example in which the printing apparatus 1 is a so-called serial printing apparatus that moves the printing head 9 relative to a printing medium to print an image. However, the printing apparatus 1 is not limited to a serial printing apparatus. The printing apparatus 1 in the present embodiment may be a printing apparatus called a full multi-head in which a printing head is fixed and a printing medium is conveyed, which has been developed in response to the demand for high productivity in recent years. It goes without saying that a configuration using one ink color for one printing head can be employed in the case of a full multi-head.

In the above description, each circulating pump 500 is disposed in the printing head 9, and each ink is circulated through the corresponding circulation channel inside the printing head 9. This is because, in the case where circulation channels are formed inside the printing head 9, the channel width is narrow and therefore the circulation channels are easily affected by bubbles generated therein. The method of the present embodiment is also applicable to configurations in which circulation channels are formed outside the printing head 9. It also goes without saying that the method of the present embodiment is a method to prevent troubles due to generation of bubbles inside the circulation channels, and the positions to install the circulating pumps 500 are not limited.

In the above description, the circulating pumps 500 having the diaphragm 506 are used. Besides the pump that operates using the diaphragm 506, each circulating pump 500 may be a pump configured to operate with a mechanism that physically squeezes a tube with rollers, like a tube pump. It goes without saying that, regardless of the configuration of the circulating pump 500, the method of the present embodiment, which reduces the effect of bubbles inside the circulation channel, is applicable by changing parameters for controlling the number of times of driving of the pump.

Second Embodiment

In the first embodiment, a description has been given of a method of performing bubble discharge circulation after suction operation representing an example of a situation where many bubbles are present inside the ink circulation channels. In a second embodiment, a description will be given of control of bubble discharge circulation in a case where the printing apparatus 1 has been left unused for a long time representing another example of the situation where many bubbles are present inside the ink circulation channels. In the present embodiment, its difference from the first embodiment will be mainly described. Features that are not particularly specified are the same components and processes as those in the first embodiment.

Figure 17:
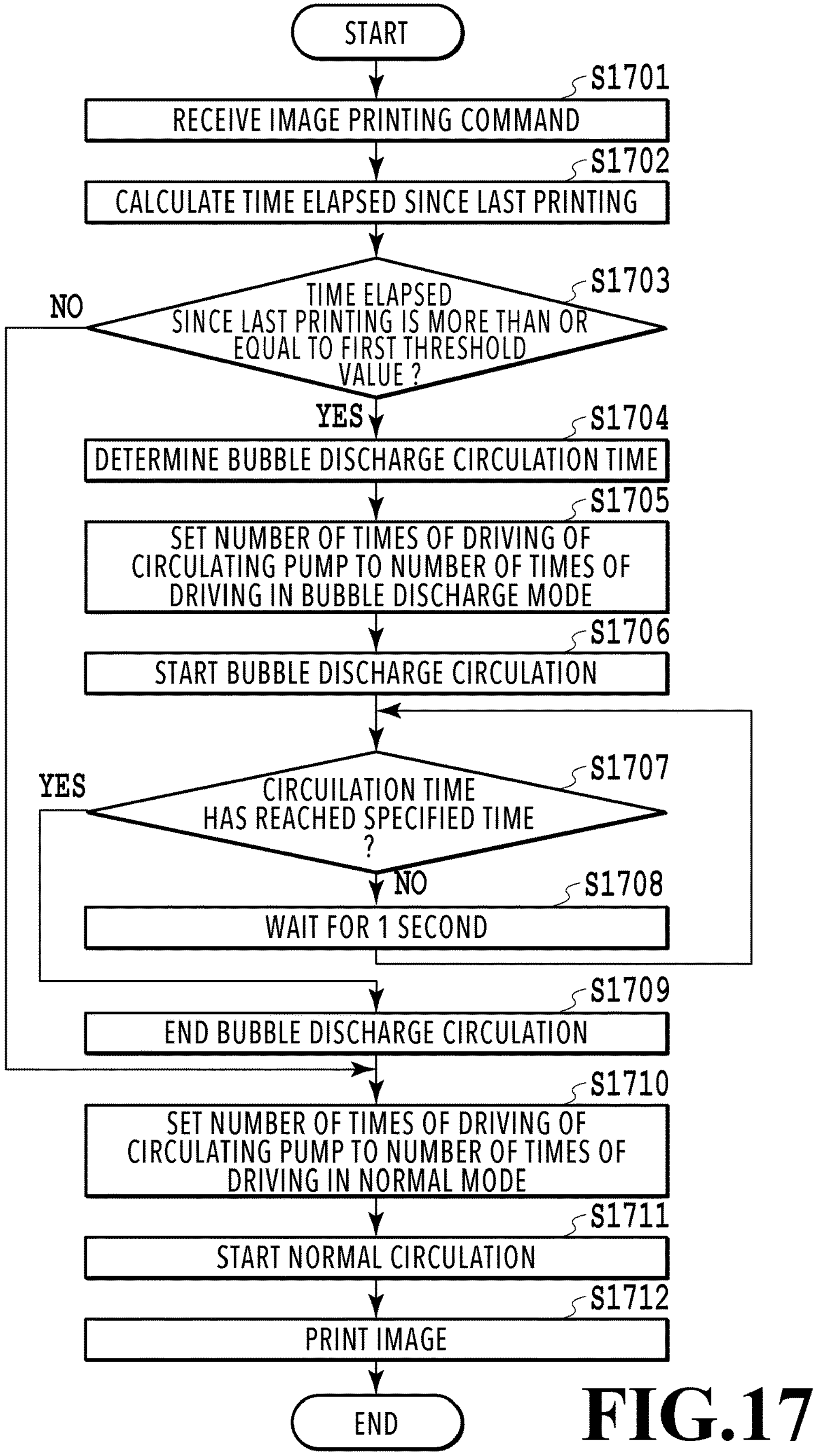
FIG. 17 is a flowchart for describing a printing operation.

FIG. 17 is a flowchart for describing processing for performing a printing operation in the present embodiment. For simplicity, the processing will be described while omitting description of similar steps to the steps described in the first embodiment.

In S1701, which is the same process as S1511, the MPU 102 receives an image printing command, and starts a printing data generating process necessary for image printing, such as image processing.

In S1702, the MPU 102 calculates the time elapsed since the last-performed printing operation. In the present embodiment, a bubble discharge circulation process is performed according to the time elapsed since the last-performed printing operation.

In the control ROM 105, the printing apparatus 1 has a non-volatile memory capable of recording the usage of the printing apparatus 1 and a clock function that keeps track of the current time. The time elapsed since the last-performed printing operation is calculated using the non-volatile memory and the clock function. For example, the MPU 102 records the time at which a printing operation was performed in the non-volatile memory in the control ROM 105 and, each time a printing operation is performed, updates the time at which the printing operation was performed to record the time at which the last printing operation was performed. The MPU 102 obtains the current time when receiving the image printing command in S1701 by using the clock function, and calculates the difference between the current time and the time at which the last printing operation was performed to calculate the time elapsed since the last-performed printing operation.

The printing apparatus 1 does not have to have the clock function or non-volatile memory. In that case, if, for example, the printing apparatus 1 is connected to a personal computer, the time elapsed since the last-performed printing operation may be calculated utilizing the personal computer's timer function, and the printing apparatus 1 may obtain the calculated elapsed time. Thus, the method of calculating the time elapsed since the last-performed printing operation is not limited.

In S1703, the MPU 102 determines whether or not the time elapsed since the last-performed printing operation is more than or equal to a first threshold value. If determining that the elapsed time is more than or equal to the first threshold value, the MPU 102 advances the processing to S1704. Then, processes for performing bubble discharge circulation are performed in S1704 to S1709. If the elapsed time is less than the first threshold value, the MPU 102 skips the bubble discharge circulation steps S1704 to S1709 and advances the processing to S1710.

FIG. 18 is a table illustrating a list of times elapsed since the last-performed printing operation and ink circulation times for bubble discharge circulation for the respective elapsed times. For example, a value of 1 week representing a first threshold value corresponding to a condition 1 and a value of 1 month representing a second threshold value corresponding to a condition 2 are recorded as operation conditions in the control ROM 105. In S1703, whether or not the time elapsed since the last-performed printing operation is more than or equal to 1 week, or the first threshold value, is determined.

In S1704, the MPU 102 determines the ink circulation time in the bubble discharge mode (bubble discharge circulation time). The MPU 102 determines the bubble discharge circulation time such that the longer the time elapsed since the last-performed printing operation, the longer the bubble discharge circulation time. In the present embodiment, using the table of FIG. 18, the MPU 102 sets 60 seconds under the condition 1 as the bubble discharge circulation time in a case where the time elapsed since the last-performed printing operation is more than or equal to 1 week and less than 1 month. In a case where the time elapsed since the last-performed printing operation is more than or equal to 1 month, the MPU 102 sets 180 seconds under the condition 2 as the bubble discharge circulation time. For example, in a case where the printing apparatus 1 has been left unused for half a year or longer, 180 seconds, which is the circulation time under the condition 2, is set.

The subsequent processes of S1705 to S1710 are similar to S1504 to S1509 in FIG. 15 described in the first embodiment, and detailed description thereof is therefore omitted. Incidentally, whether the circulation time has reached a specified time is determined in S1707. In the present embodiment, the specified time is the bubble discharge circulation time set in S1704.

The processes of S1710 to S1712 are processes that are performed regardless of whether a bubble discharge circulation process was performed in S1704 to S1709 or bubble discharge circulation was determined to be unnecessary and not performed. The process of S1710 is similar to S1509 in FIG. 15 and the processes of S1711 and S1712 are similar to S1512 and S1513 in FIG. 15, and detailed description thereof is therefore omitted.

The above is an example of a method of controlling bubble discharge circulation in a case where no printing operation has been performed for a predetermined time. In a case where the printing apparatus 1 has been left unused for a long time and no printing operation has been performed for a predetermined time, it is possible that many bubbles have been generated inside the circulation channels due to insufficient gas barrier properties of the resin of the printing head 9 and the tubes forming the circulation channels. For this reason, in the present embodiment, the printing apparatus 1 is controlled to perform bubble discharge circulation before performing a printing operation in a case where the printing apparatus 1 is caused to operate again after being left unused for a long time. Such control prevents poor ink circulation due to bubbles and provides a condition suitable printing operations.

In the present embodiment, the bubble discharge circulation time is controlled to be longer the longer the time elapsed since the last-performed printing operation. This is because the longer the time for which the printing head 9 has performed printing, the more bubbles are assumed to be present inside the printing head 9, and the longer the time it will take to move all bubbles inside each circulation channel to the bubble buffer in an upper portion of the first liquid chamber 180.

In a case where the time elapsed since the last-performed printing operation is long, it is possible that thickened inks have stuck to the nozzles in the printing head 9. For this reason, in a case where the time elapsed since the last-performed printing operation is longer than a predetermined time, cleaning involving a suction operation may be performed before a printing operation. For example, control may be performed to perform cleaning involving a suction operation according to the time elapsed since the last-performed printing operation, and perform bubble discharge circulation after the suction operation. Specifically, a step of determining whether to perform cleaning involving a suction operation may be added to the flowchart of FIG. 17. Alternatively, the process flow of FIG. 15 or FIG. 17 may be implemented according to the time elapsed since the last-performed printing operation. The advantage of the present embodiment can be achieved regardless of the combination.

Third Embodiment

In a third embodiment, a description will be given of a printing apparatus 1 that switches processing based on determination of whether many bubbles are present in circulation channels. In the present embodiment, its difference from the first embodiment will be mainly described. Features that are not particularly specified are the same components and processes as those in the first embodiment.

Figure 19:
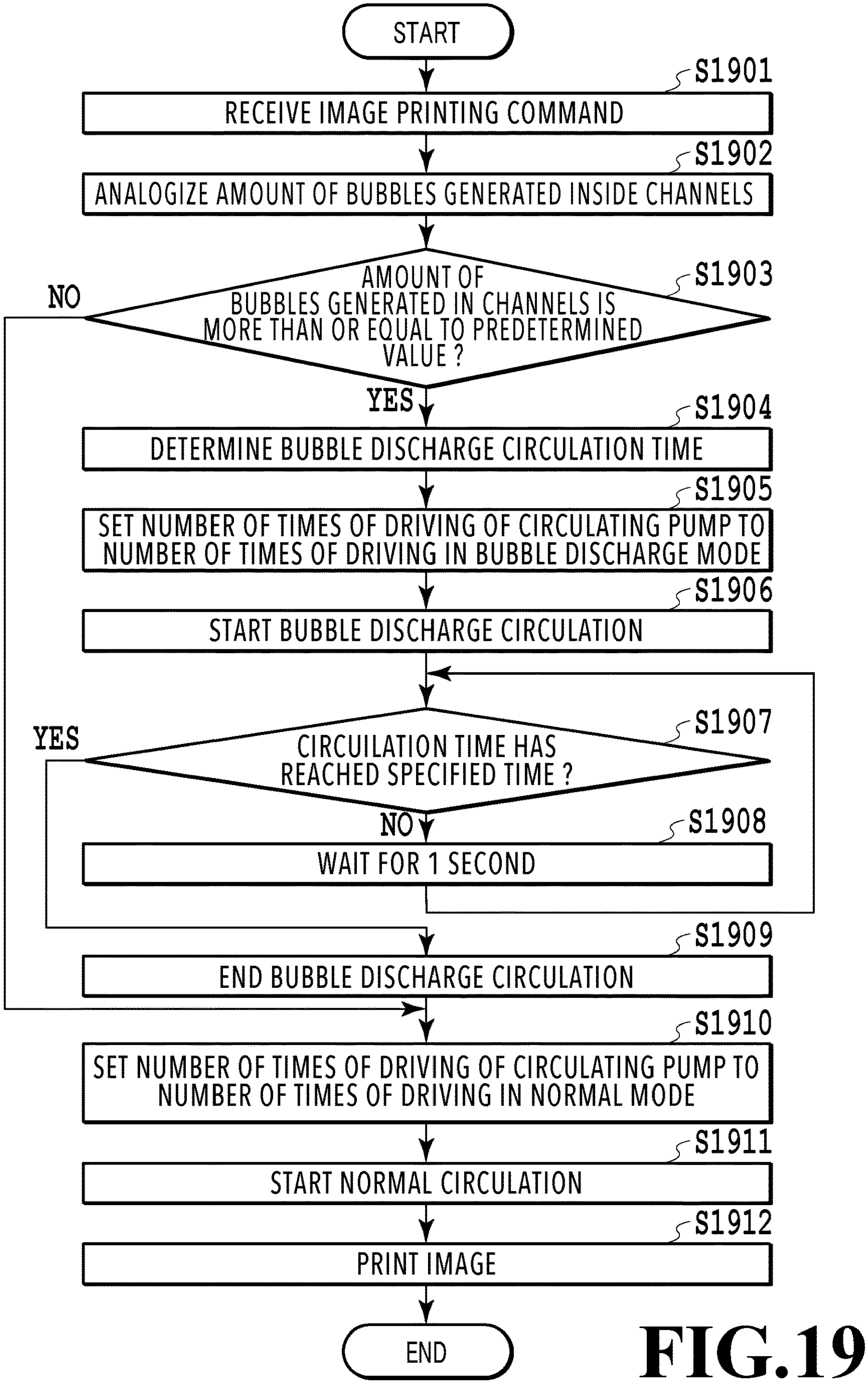
FIG. 19 is a flowchart for describing a printing operation.

FIG. 19 is a flowchart for describing processing for performing a printing operation in the present embodiment. For simplicity, the processing will be described while omitting description of similar steps to the steps described in the embodiments described above.

In S1901, which is the same process as S1701, the MPU 102 receives an image printing command, and starts a printing data generating process necessary for image printing, such as image processing.

In S1902, the MPU 102 determines whether the amount of bubbles generated in the circulation channels is larger than a predetermined value or smaller than the predetermined value. The amount of bubbles generated is determined by analogy. There are several possible methods of analogizing the amount of bubbles generated.

FIG. 20 is a table holding amounts of bubbles generated inside the circulation channels corresponding to respective times elapsed since the last-performed printing operation and respective average environmental temperatures. The vertical axis (first column) of the table of FIG. 20 holds the times elapsed since the last-performed printing operation while the horizontal axis (first row) holds the average environmental temperatures of the printing apparatus 1 which has not performed a printing operation and has been left unused. Moreover, each cell in the table holds an amount of bubbles generated corresponding to a time elapsed since the last-performed printing operation and an average environmental temperature of the printing apparatus 1 in a state of being left unused. In FIG. 20, "MANY" represents a case where the amount of bubbles generated inside the circulation channels is analogized to be more than or equal to the predetermined value, while "FEW" represents a case where the amount of bubbles generated inside the circulation channels is analogized to be less than the predetermined value. By using FIG. 20, whether to perform bubble discharge circulation can be determined based on the time elapsed since the last-performed printing operation, as in the second embodiment.

Besides the method in which a table as illustrated in FIG. 20 is used to analogize the amount of bubbles generated, for example, a calculation formula to analogize the amount of bubbles generated may be derived by empirically measuring amounts of bubbles generated corresponding to times elapsed since the last-performed printing operation and environmental temperatures of the printing apparatus 1 in a state of being left unused. Then, the amount of bubbles generated may be calculated by plugging the elapsed time and the environmental temperature into the calculation formula to analogize the amount of bubbles generated.

As another method of analogizing the amount of bubbles generated, for example, a method in which the amount of bubbles generated is analogized based on the error status during the last-performed printing operation may be used. For example, there is a case where the temperature of the printing head 9 is monitored in order to protect the printing head 9 and the main body of the printing apparatus 1, and the printing apparatus 1 is equipped with a protection function to forcibly stop an image printing operation in a case where the temperature becomes a predetermined value or higher. In a case where the temperature of the printing head 9 has risen above an expected temperature, it is possible that pressure chambers near nozzles (ejection orifices) are filled with bubbles instead of the inks due to some trouble and have been heated in an empty state. In other words, in the case where the temperature of the printing head 9 has risen, it is possible that the many bubbles have been generated inside the circulation channels. Thus, at the time of performing a printing operation, the MPU 102 may check a history indicating whether the temperature of the printing head 9 has become high in S1902, and determine that the amount of bubbles generated inside the circulation channels is more than the predetermined value in a case where a high-temperature error had occurred.

The printing apparatus 1 may experience errors such as a paper jam. A paper jam sometimes occurs due to contact between a sheet being a printing medium and the liquid surfaces in the nozzle (ejection orifice) opening portions of the printing head 9. As a rule, menisci are formed on the liquid surfaces in the nozzle (ejection orifice) opening portions of the printing head 9 by surface tension, so that the inks do not drip out of the nozzles (ejection orifices). However, physical contact with a conveyed sheet may break the menisci. If the menisci are broken, the inks are discharged out of the nozzles (ejection orifices) even without performing control to discharge the inks. Thus, bubbles are likely to get in in place of the inks. For this reason, after a particular error like a paper jam occurs, the MPU 102 may determine in S1902 that the amount of bubbles generated inside the circulation channels is more than the predetermined value.

In S1903, the MPU 102 determines whether or not the amount of bubbles generated inside the channels was determined to be more than or equal to the predetermined value in S1902. The MPU 102 advances the processing to S1904 if determining that the amount of bubbles generated was more than or equal to the predetermined value. The MPU 102 advances the processing to S1910 if determining that the amount of bubbles generated was less than the predetermined value.

S1904 to S1912 are similar to S1704 to S1712 in FIG. 17, and detailed description thereof is therefore omitted below. Various kinds of control such as increasing the bubble discharge circulation time in S1904 according to the analogized amount of bubbles generated may be performed. For example, the time for which to drive the circulating pump 500 at the number of times of driving fr1 in the bubble discharge mode may be controlled to be longer, the larger the analogized amount of bubbles generated in the circulation channel.

Note that the above-described method of analogizing the amount of bubbles generated is a mere example among conceivable methods. There are various analogization methods other than the above-described method such as a method utilizing the time elapsed since the opening of the ink tanks and a method utilizing the amounts of the inks discharged during image printing operations, for example. It is also possible to employ a method in which, for example, each ink circulation channel is equipped with a sensor that measures an amount of dissolution in the liquid, and the amount of bubbles generated is analogized to be more than a predetermined value in a case where the value of the sensor output is more than or equal to a certain value. Any analogization methods are applicable to the present embodiment.

As described above, in the present embodiment, it is possible to analogize the amount of bubbles generated in the circulation channels and control the pump circulation appropriately according to the result of the analogization. According to the present disclosure, it is possible to reduce the effect of bubbles inside a circulation channel.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-201568 filed Dec. 16, 2022, which are hereby incorporated by reference wherein in their entirety.

What is claimed is:

1. A liquid ejecting apparatus comprising:

a circulation channel through which a liquid circulates, the circulation channel including a pressure chamber having an ejection orifice configured to discharge the liquid onto a printing medium, a supply channel configured to supply the liquid to the pressure chamber, and a collection channel configured to collect the liquid from the pressure chamber;

a circulating pump configured to circulate the liquid in the circulation channel; and a control unit configured to perform control that drives the circulating pump at a first number of times of driving per unit time in a case of performing a printing operation in which the liquid is ejected onto a printing medium, and drives the circulating pump at a second number of times of driving per unit time smaller than the first number of times of driving per unit time in a predetermined case which is before performing the printing operation.

2. The liquid ejecting apparatus according to claim 1, wherein the predetermined case is a case where an operation of sucking the liquid out of the ejection orifice is performed.

3. The liquid ejecting apparatus according to claim 2, wherein the control unit controls a time for which to drive the circulating pump at the second number of times of driving per unit time such that the higher strength of the suction of the liquid out of the ejection orifice, the longer the time for which to drive the circulating pump at the second number of times of driving per unit time.

4. The liquid ejecting apparatus according to claim 2, wherein the control unit controls a time for which to drive the circulating pump at the second number of times of driving per unit time such that the time for which to drive the circulating pump at the second number of times of driving per unit time is longer in a case where the operation of sucking the liquid out of the ejection orifice is performed with a valve closing operation than in a case where the operation of sucking the liquid out of the ejection orifice is performed without the valve closing operation.

5. The liquid ejecting apparatus according to claim 1, wherein the predetermined case is a case where a time elapsed since a last-performed printing operation is longer than a threshold value.

6. The liquid ejecting apparatus according to claim 5, wherein the control unit controls a time for which to drive the circulating pump at the second number of times of driving per unit time such that the longer the time elapsed since the last-performed printing operation, the longer the time for which to drive the circulating pump at the second number of times of driving per unit time.

7. The liquid ejecting apparatus according to claim 1, wherein the predetermined case is a case where the control unit determines that bubbles have been generated in the circulation channel in an amount that is more than or equal to a predetermined value.

8. The liquid ejecting apparatus according to claim 7, wherein the control unit determines whether or not bubbles have been generated in the circulation channel in an amount that is more than or equal to the predetermined value based on a time elapsed since a last-performed printing operation and an environmental temperature.

9. The liquid ejecting apparatus according to claim 7, wherein the control unit determines that bubbles have been generated in the circulation channel in an amount that is more than or equal to the predetermined value after a particular error occurs.

10. The liquid ejecting apparatus according to claim 9, wherein the particular error is an error due to a temperature becoming a predetermined value or more or an error that occurs due to a jam of a printing medium.

11. The liquid ejecting apparatus according to claim 7, wherein the control unit controls a time for which to drive the circulating pump at the second number of times of driving per unit time such that the time for which to drive the circulating pump at the second number of times of driving per unit time is longer in a case of determining that an amount of bubbles generated in the circulation channel is a first value than in a case of determining that the amount of bubbles generated in the circulation channel is a second value smaller than the first value.

12. The liquid ejecting apparatus according to claim 1, wherein the control unit controls a number of times of driving of the circulating pump per unit time.

13. The liquid ejecting apparatus according to claim 1, wherein the circulating pump has a pump chamber which contains the liquid in the circulation channel, and is driven once by performing an operation of deforming a member forming the pump chamber and bringing the deformed member back to an original state.

14. The liquid ejecting apparatus according to claim 13, wherein the larger the number of times of driving of the circulating pump, the smaller an amount of deformation of the member in a single driving operation.

15. The liquid ejecting apparatus according to claim 13, wherein the member is a diaphragm, and the circulating pump is a pump which is driven by deforming the diaphragm with a piezoceramic.

16. The liquid ejecting apparatus according to claim 1, further comprising a liquid chamber which communicates with the circulation channel and is configured to contain bubbles generated in the circulation channel.

17. The liquid ejecting apparatus according to claim 1, further comprising a liquid ejecting head, wherein the liquid ejecting head includes the circulation channel and the circulating pump.

18. A control method of controlling a liquid ejecting apparatus, the liquid ejecting apparatus comprising:

a circulation channel through which a liquid circulates, the circulation channel including a pressure chamber having an ejection orifice configured to discharge the liquid onto a printing medium, a supply channel configured to supply the liquid to the pressure chamber, and a collection channel configured to collect the liquid from the pressure chamber; and a circulating pump configured to circulate the liquid in the circulation channel; and, the control method comprising:

driving the circulating pump at a first number of times of driving per unit time in a case of performing a printing operation in which the liquid is ejected onto a printing medium; and driving the circulating pump at a second number of times of driving per unit time smaller than the first number of times of driving per unit time in a predetermined case which is before performing the printing operation.

19. A non-transitory computer readable storage medium storing a program which causes a computer to perform a control method of controlling a liquid ejecting apparatus, the liquid ejecting apparatus comprising:

a circulation channel through which a liquid circulates, the circulation channel including a pressure chamber having an ejection orifice configured to discharge the liquid onto a printing medium, a supply channel configured to supply the liquid to the pressure chamber, and a collection channel configured to collect the liquid from the pressure chamber; and a circulating pump configured to circulate the liquid in the circulation channel; and, the control method comprising:

driving the circulating pump at a first number of times of driving per unit time in a case of performing a printing operation in which the liquid is ejected onto a printing medium; and driving the circulating pump at a second number of times of driving per unit time smaller than the first number of times of driving per unit time in a predetermined case which is before performing the printing operation.

* * * * *